US008824173B2

(12) United States Patent
Fang et al.

(10) Patent No.: US 8,824,173 B2
(45) Date of Patent: Sep. 2, 2014

(54) SYSTEMS AND METHODS FOR CONSTANT VOLTAGE CONTROL AND CONSTANT CURRENT CONTROL

(75) Inventors: Lieyi Fang, Shanghai (CN); Zhiqiang Sun, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 13/465,899

(22) Filed: May 7, 2012

(65) Prior Publication Data

US 2013/0258723 A1    Oct. 3, 2013

(30) Foreign Application Priority Data

Mar. 31, 2012  (CN) .......................... 2012 1 0099930

(51) Int. Cl.
*H02M 3/335* (2006.01)
(52) U.S. Cl.
CPC ...... *H02M 3/33507* (2013.01); *H02M 3/33515* (2013.01)
USPC ........................................................ 363/21.18
(58) Field of Classification Search
USPC ............ 363/21.04, 21.05, 21.07, 21.1, 21.11, 363/21.12, 21.13, 21.15, 21.18, 97
See application file for complete search history.

(56) References Cited

U.S. PATENT DOCUMENTS

| 6,977,824 | B1 | 12/2005 | Yang et al. |
| 7,061,780 | B2 | 6/2006 | Yang et al. |
| 7,535,736 | B2 | 5/2009 | Nakamura et al. |
| 8,013,544 | B2 | 9/2011 | Negrete et al. |
| 8,144,487 | B2 | 3/2012 | Djenguerian et al. |
| 8,391,028 | B2 | 3/2013 | Yeh |
| 8,416,596 | B2 * | 4/2013 | Huang ............................. 363/97 |
| 8,630,103 | B2 | 1/2014 | Bäurle et al. |
| 2009/0051336 | A1 | 2/2009 | Hartlieb et al. |
| 2009/0051340 | A1 | 2/2009 | Wang |
| 2010/0128501 | A1 * | 5/2010 | Huang et al. ................ 363/21.16 |
| 2010/0141178 | A1 | 6/2010 | Negrete et al. |
| 2010/0321956 | A1 | 12/2010 | Yeh |
| 2012/0075891 | A1 * | 3/2012 | Zhang et al. ................ 363/21.18 |

(Continued)

FOREIGN PATENT DOCUMENTS

| CN | 1806381 A | 7/2006 |
| CN | 101056063 A | 10/2007 |

(Continued)

OTHER PUBLICATIONS

Chinese Patent Office, Office Action mailed Nov. 22, 2013, in Application No. 201110376439.0.

(Continued)

*Primary Examiner* — Gary L Laxton
*Assistant Examiner* — Alex Torres-Rivera
(74) *Attorney, Agent, or Firm* — Jones Day

(57) ABSTRACT

System and method for regulating a power conversion system. A system controller for regulating a power conversion system includes a first controller terminal, a second controller terminal and a third controller terminal. The system controller is configured to receive an input signal at the first controller terminal and turn on or off a switch based on at least information associated with the input signal to adjust a primary current flowing through a primary winding of the power conversion system, receive a first signal at the second controller terminal from the switch, and charge a capacitor through the third controller terminal in response to the first signal.

19 Claims, 16 Drawing Sheets

(56) References Cited

U.S. PATENT DOCUMENTS

| | | |
|---|---|---|
| 2012/0155122 A1 | 6/2012 | Tang et al. |
| 2012/0195076 A1* | 8/2012 | Zhang et al. ............... 363/21.12 |
| 2012/0281438 A1* | 11/2012 | Fang et al. ................. 363/21.12 |
| 2013/0033905 A1* | 2/2013 | Lin et al. .................... 363/21.13 |
| 2013/0114307 A1* | 5/2013 | Fang .......................... 363/21.01 |
| 2013/0119881 A1* | 5/2013 | Fang et al. ................... 315/210 |

FOREIGN PATENT DOCUMENTS

| | | |
|---|---|---|
| CN | 201087939 Y | 7/2008 |
| CN | 101248574 A | 8/2008 |
| CN | 1882214 B | 5/2011 |
| CN | 102065602 A | 5/2011 |
| CN | 102076138 A | 5/2011 |
| CN | 102105010 A | 6/2011 |
| CN | 102158091 A | 8/2011 |
| CN | 102164439 A | 8/2011 |
| CN | 102185466 A | 9/2011 |
| CN | 102361402 A | 2/2012 |
| TW | 185041 B | 6/1992 |
| WO | WO 2007/041897 A1 | 4/2007 |

OTHER PUBLICATIONS

Taiwanese Patent Office, Office Action mailed Oct. 22, 2013, in Application No. 100120903.

United States Patent and Trademark Office, Office Action mailed Aug. 13, 2013, in U.S. Appl. No. 13/152,646.

Chinese Patent Office, Office Action mailed Apr. 3, 2014, in Application No. 201210258359.X.

Liang et al., "Differential Detection Method of MOSFET Drain-source Voltage Valley Time," (Mar. 31, 2010).

Taiwanese Patent Office, Office Action mailed Mar. 6, 2014, in Application No. 101102919.

Chinese Patent Office, Office Action mailed Apr. 24, 2014, in Application No. 201210099930.8.

Chinese Patent Office, Office Action mailed May 14, 2014, in Application No. 201110123187.0.

United States Patent and Trademark Office, Notice of Allowance mailed May 22, 2014, in U.S. Appl. No. 13/152,646.

United States Patent and Trademark Office, Office Action mailed Jun. 9, 2014, in U.S. Appl. No. 13/572,480.

* cited by examiner

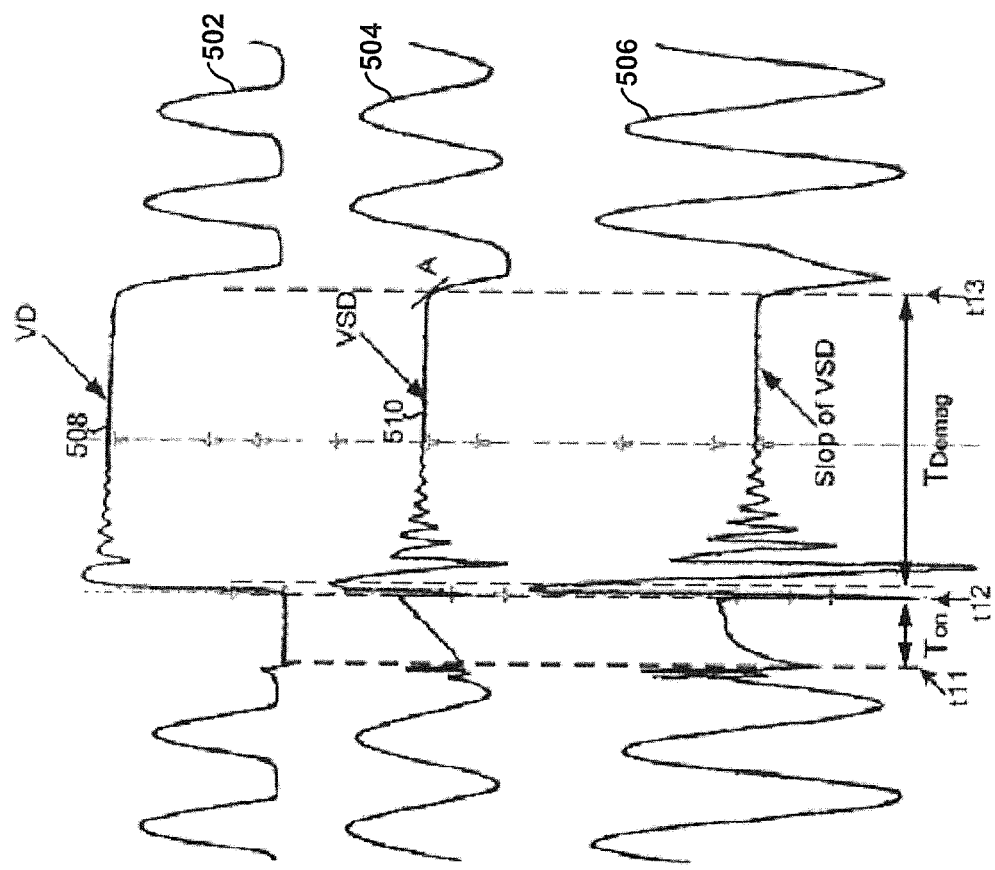

SYSTEMS AND METHODS FOR CONSTANT VOLTAGE CONTROL AND CONSTANT CURRENT CONTROL

1. CROSS-REFERENCES TO RELATED APPLICATIONS

This application claims priority to Chinese Patent Application No. 201210099930.8, filed Mar. 31, 2012, incorporated by reference herein for all purposes.

2. BACKGROUND OF THE INVENTION

The present invention is directed to integrated circuits. More particularly, the invention provides systems and methods for voltage regulation and current regulation. Merely by way of example, the invention has been applied to a power conversion system. But it would be recognized that the invention has a much broader range of applicability.

FIG. 1 is a simplified diagram showing a conventional flyback power conversion system. The power conversion system 100 includes a primary winding 110, a secondary winding 112, a power switch 120, a current sensing resistor 130, a rectifying diode 160, a capacitor 162, an isolated feedback component 114, and a controller 170. The controller 170 includes an under-voltage-lockout component 172, a pulse-width-modulation generator 174, a gate driver 176, a leading-edge-blanking (LEB) component 178, and an over-current-protection (OCP) component 180. For example, the power switch 120 is a bipolar transistor. In another example, the power switch 120 is a field effect transistor.

As shown in FIG. 1, the power conversion system 100 uses a transformer including the primary winding 110 and the secondary winding 112 to isolate an AC input voltage 102 on the primary side and an output voltage 104 on the secondary side. Information related to the output voltage 104 is processed by the isolated feedback component 114 which generates a feedback signal 154. The controller 170 receives the feedback signal 154, and generates a gate-drive signal 156 to turn on and off the switch 120 in order to regulate the output voltage 104.

To achieve good output current control, the power conversion system 100 often needs additional circuitry in the secondary side, which usually results in high cost. Moreover, the required output current sensing resistor in the secondary side usually reduces the efficiency of the power conversion system 100.

FIG. 2 is a simplified diagram showing another conventional flyback power conversion system. The power conversion system 200 includes a primary winding 210, a secondary winding 212, an auxiliary winding 214, a power switch 220, a current sensing resistor 230, two rectifying diodes 260 and 268, two capacitors 262 and 270, and two resistors 264 and 266. For example, the power switch 220 is a bipolar transistor. In another example, the power switch 220 is a MOS transistor.

Information related to the output voltage 250 can be extracted through the auxiliary winding 214 in order to regulate the output voltage 250. When the power switch 220 is closed (e.g., on), the energy is stored in the secondary winding 212. Then, when the power switch 220 is open (e.g., off), the stored energy is released to the output terminal, and the voltage of the auxiliary winding 214 maps the output voltage on the secondary side as shown below.

$$V_{FB} = \frac{R_2}{R_1 + R_2} \times V_{aux} \quad \text{(Equation 1)}$$

where $V_{FB}$ represents a feedback voltage 274, and $V_{aux}$ represents a voltage 254 of the auxiliary winding 214. $R_1$ and $R_2$ represent the resistance values of the resistors 264 and 266 respectively.

A switching period of the switch 220 includes an on-time period during which the switch 220 is closed (e.g., on) and an off-time period during which the switch 220 is open (e.g., off). For example, in a continuous conduction mode (CCM), a next switching cycle starts before the completion of a demagnetization process associated with the transformer including the primary winding 210 and the secondary winding 212. Thus, the actual length of the demagnetization process before the next switching cycle starts is limited to the off-time period of the switch. In another example, in a discontinuous conduction mode (DCM), a next switching cycle does not start until a period of time after the demagnetization process has completed. In yet another example, in a quasi-resonant (QR) mode or a critical conduction mode (CRM), a next switching cycle starts shortly after the completion of the demagnetization process.

FIG. 3(A) is a simplified conventional timing diagram for the flyback power conversion system 200 that operates in the continuous conduction mode (CCM). The waveform 302 represents the voltage 254 of the auxiliary winding 214 as a function of time, the waveform 304 represents a secondary current 278 that flows through the secondary winding 212 as a function of time, and the waveform 306 represents a primary current 276 that flows through the primary winding 210 as a function of time.

For example, a switching period, $T_s$, starts at time $t_0$ and ends at time $t_2$, an on-time period, $T_{on}$, starts at the time $t_0$ and ends at time $t_1$, and an off-time period, $T_{off}$, starts at the time $t_1$ and ends at the time $t_2$. In another example, $t_0 \le t_1 \le t_2$.

During the on-time period $T_{on}$, the power switch 220 is closed (e.g., on), and the primary current 276 flows through the primary winding 210 and increases from a magnitude 308 (e.g., $I_{pri\_0}$ at $t_0$) to a magnitude 310 (e.g., $I_{pri\_p}$ at $t_1$) as shown by the waveform 306. The energy is stored in the secondary winding 212, and the secondary current 278 is at a low magnitude 312 (e.g., approximately zero) as shown by the waveform 304. The voltage 254 of the auxiliary winding 214 keeps at a magnitude 314 (e.g., as shown by the waveform 302).

At the beginning of the off-time period $T_{off}$ (e.g., at $t_1$), the switch 220 is open (e.g., off), the primary current 276 is reduced from the magnitude 310 (e.g., $I_{pri\_p}$) to a magnitude 316 (e.g., approximately zero) as shown by the waveform 306. The energy stored in the secondary winding 212 is released to the output load. The secondary current 278 increases from the magnitude 312 (e.g., approximately zero) to a magnitude 318 (e.g., $I_{sec\_p}$) as shown by the waveform 304. The voltage 254 of the auxiliary winding 214 increases from the magnitude 314 to a magnitude 320 (e.g., as shown by the waveform 302).

During the off-time period $T_{off}$, the switch 220 remains open, the primary current 276 keeps at the magnitude 316 (e.g., approximately zero) as shown by the waveform 306. The secondary current 278 decreases from the magnitude 318 (e.g., $I_{sec\_p}$) to a magnitude 322 (e.g., $I_{sec\_2}$ at $t_2$) as shown by the waveform 304. The voltage 254 of the auxiliary winding 214 decreases from the magnitude 320 to a magnitude 324 (e.g., as shown by the waveform 302).

At the end of the off-time period $T_{off}$ (e.g., $t_2$), a next switching cycle starts before the demagnetization process is completed. The residual energy reflects back to the primary winding 210 and appears as an initial primary current, $I_{pri\_0}$, at the beginning of the next switching cycle.

For example, the primary current 276 and the secondary current 278 satisfy the following equations:

$$I_{sec\_p} = N \times I_{pri\_p} \quad \text{(Equation 2)}$$

$$I_{sec\_2} = N \times I_{pri\_0} \quad \text{(Equation 3)}$$

where $I_{sec\_p}$ represents the secondary current 278 when the off-time period $T_{off}$ starts, and $I_{sec\_2}$ represents the secondary current 278 when the off-time period $T_{off}$ ends. Additionally, $I_{pri\_p}$ represents the primary current 276 when the on-time period $T_{on}$ ends, $I_{pri\_0}$ represents the primary current 276 when the on-time period $T_{on}$ starts, and N represents a turns ratio between the primary winding 210 and the secondary winding 212.

The output current 252 can be determined based on the following equation:

$$I_{out} = \frac{1}{2} \times \frac{1}{T} \times \int_0^T (I_{sec\_p} + I_{sec\_2}) \times \frac{T_{demag}}{T_s} dt \quad \text{(Equation 4)}$$

where $I_{out}$ represents the output current 252, T represents an integration period, $T_s$ represents a switching period, and $T_{demag}$ represents the duration of the demagnetization process within the switching period. For example, $T_{demag}$ is equal to the off-time period $T_{off}$ in the CCM mode.

Combining the equations 2, 3 and 4, one can obtain the following equation.

$$I_{out} = \frac{N}{2} \times \frac{1}{T} \times \int_0^T (I_{pri\_p} + I_{pri\_0}) \times \frac{T_{demag}}{T_s} dt \quad \text{(Equation 5)}$$

Referring to FIG. 2, the resistor 230, in combination with other components, generates a current-sensing voltage signal 272 (e.g., $V_{cs}$) which is related to the primary current 276. For example, the output current 252 can be determined according to the following equation:

$$I_{out} = \frac{N}{2} \times \frac{1}{R_s \times T} \times \int_0^T (V_{cs1} + V_{cs0}) \times \frac{T_{demag}}{T_s} dt \quad \text{(Equation 6)}$$

where $V_{cs0}$ represents the current-sensing voltage signal 272 when an on-time period starts during a switching cycle, $V_{cs1}$ represents the current-sensing voltage signal 272 when the on-time period ends during the switching cycle, and $R_s$ represents the resistance of the resistor 230.

In another example, the output current 252 can be determined based on the following equation:

$$I_{out} = \frac{N}{2} \times \frac{1}{R_s \times K} \times \sum_1^K (V_{cs1}(n) + V_{cs0}(n)) \times \frac{T_{demag}(n)}{T_s(n)} \quad \text{(Equation 7)}$$

where n corresponds to the $n^{th}$ switching cycle, $V_{cs0}(n)$ represents a magnitude of the current-sensing voltage signal 272 when an on-time period $T_{on}$ starts in the $n^{th}$ switching cycle, and $V_{cs1}(n)$ represents a magnitude of the current-sensing voltage signal 272 when the on-time period ends in the $n^{th}$ switching cycle. Additionally, K represents the number of switching cycles that are included in the calculation. For example, K can be infinite; that is, the calculation of Equation 7 can include as many switching cycles as needed. As shown in Equations 6 and 7, the output current 252 may be regulated (e.g., be kept constant) based on information associated with the current-sensing voltage signal 272.

FIG. 3(B) is a simplified conventional timing diagram for the flyback power conversion system 200 that operates in the discontinuous conduction mode (DCM). The waveform 332 represents the voltage 254 of the auxiliary winding 214 as a function of time, the waveform 334 represents a secondary current 278 that flows through the secondary winding 212 as a function of time, and the waveform 336 represents a primary current 276 that flows through the primary winding 210 as a function of time.

For example, as shown in FIG. 3(B), a switching period, $T_s$, starts at time $t_3$ and ends at time $t_6$, an on-time period, $T_{on}$, starts at the time $t_3$ and ends at time $t_4$, a demagnetization period, $T_{demag}$ starts at the time $t_4$ and ends at time $t_5$, and an off-time period, $T_{off}$, starts at the time $t_4$ and ends at the time $t_6$. In another example, $t_3 \leq t_4 \leq t_5 \leq t_6$. In DCM, the off-time period, $T_{off}$, is much longer than the demagnetization period, $T_{demag}$.

During the demagnetization period $T_{demag}$, the switch 220 remains open, the primary current 276 keeps at a magnitude 338 (e.g., approximately zero) as shown by the waveform 336. The secondary current 278 decreases from a magnitude 340 (e.g., $I_{sec\_p}$ at $t_4$) as shown by the waveform 334. The demagnetization process ends at the time $t_5$ when the secondary current 278 has a low magnitude 342 (e.g., zero). The secondary current 278 keeps at the magnitude 342 for the rest of the switching cycle.

A next switching cycle starts after the completion of the demagnetization process (e.g., at the time $t_6$). For example, little residual energy reflects back to the primary winding 210 and the primary current 276 (e.g., $I_{pri\_0}$ at $t_6$) at the beginning of the next switching cycle has a low magnitude 344 (e.g., zero).

FIG. 3(C) is a simplified conventional timing diagram for the flyback power conversion system 200 that operates in the quasi-resonant (QR) mode or the critical conduction mode (CRM). The waveform 352 represents the voltage 254 of the auxiliary winding 214 as a function of time, the waveform 354 represents a secondary current 278 that flows through the secondary winding 212 as a function of time, and the waveform 356 represents a primary current 276 that flows through the primary winding 210 as a function of time.

For example, as shown in FIG. 3(C), a switching period, $T_s$, starts at time $t_7$ and ends at time $t_{10}$, an on-time period, $T_{on}$, starts at the time $t_7$ and ends at time $t_8$, a demagnetization period, $T_{demag}$ starts at the time $t_8$ and ends at time $t_9$, and an off-time period, $T_{off}$, starts at the time $t_8$ and ends at the time $t_{10}$. In another example, $t_7 \leq t_8 \leq t_9 \leq t_{10}$. In the CRM mode, the demagnetization period, $T_{demag}$, is slightly shorter than the off-time of the switch, $T_{off}$.

The demagnetization process ends at the time $t_9$ when the secondary current 278 has a low magnitude 358 (e.g., zero). The secondary current 278 keeps at the magnitude 358 for the rest of the switching cycle. A next switching cycle starts (e.g., at $t_{10}$) shortly after the completion of the demagnetization process. The primary current 276 has a low magnitude 360 (e.g., zero) at the beginning of the next switching cycle.

The power conversion system 200 often cannot achieve satisfactory dynamic responses with low standby power when the output load changes from no load to full load. Hence, it is highly desirable to improve techniques for voltage regulation and current regulation of a power conversion system.

3. BRIEF SUMMARY OF THE INVENTION

The present invention is directed to integrated circuits. More particularly, the invention provides systems and methods for voltage regulation and current regulation. Merely by way of example, the invention has been applied to a power conversion system. But it would be recognized that the invention has a much broader range of applicability.

According to one embodiment, a system controller for regulating a power conversion system includes a first controller terminal, a second controller terminal and a third controller terminal. The system controller is configured to receive an input signal at the first controller terminal and turn on or off a switch based on at least information associated with the input signal to adjust a primary current flowing through a primary winding of the power conversion system, receive a first signal at the second controller terminal from the switch, and charge a capacitor through the third controller terminal in response to the first signal.

According to another embodiment, a system controller for regulating a power conversion system includes a first controller terminal and a second controller terminal. The system controller is configured to generate a drive signal at the first controller terminal to turn on or off a switch to adjust a primary current flowing through a primary winding of the power conversion system, receive a first signal at the second controller terminal from the switch, and generate a detection signal associated with a demagnetization process of the primary winding of the power conversion system based on at least information associated with the first signal.

According to yet another embodiment, a system for regulating a power conversion system includes a system controller, a feedback component and a capacitor. The system controller includes a current regulation component and a drive component, the system controller further including a first controller terminal connected to the current regulation component and a second controller terminal connected to the drive component. The feedback component is connected to the first controller terminal and configured to receive an output signal associated with a secondary winding of a power conversion system. The capacitor includes a first capacitor terminal and a second capacitor terminal, the first capacitor terminal being connected to the first controller terminal. The current regulation component is configured to receive at least a current sensing signal and affect a feedback signal at the first controller terminal based on at least information associated with the current sensing signal, the current sensing signal being associated with a primary current flowing through a primary winding of the power conversion system. The drive component is configured to process information associated with the current sensing signal and the feedback signal, generate a drive signal based on at least information associated with the current sensing signal and the feedback signal, and send the drive signal to a switch through the second controller terminal in order to adjust the primary current.

In another embodiment, a method for regulating a power conversion system by at least a system controller including a first controller terminal, a second controller terminal and a third controller terminal includes: receiving an input signal at the first controller terminal, turning on or off a switch based on at least information associated with the input signal to adjust a primary current flowing through a primary winding of the power conversion system, receiving a first signal at the second controller terminal from the switch, and charging a capacitor through the third controller terminal in response to the first signal.

In yet another embodiment, a method for regulating a power conversion system by at least a system controller including a first controller terminal and a second controller terminal include: generating a drive signal at the first controller terminal to turn on or off a switch to adjust a primary current flowing through a primary winding of the power conversion system, receiving a first signal at the second controller terminal from the switch, and generating a detection signal associated with a demagnetization process of the primary winding of the power conversion system based on at least information associated with the first signal.

Many benefits are achieved by way of the present invention over conventional techniques. Certain embodiments of the present invention provide a system and method for charging a supply capacitor through a power switch during a start-up process using a large resistor to reduce power dissipation. Some embodiments of the present invention provide a system and method for demagnetization detection using a voltage at a switching node. Certain embodiments of the present invention provide a system and method for sampling a current sensing voltage in the middle of an on-time period to avoid sampling two separate voltage signals in order to reduce sampling errors. Some embodiments of the present invention provide a system and method for sampling a current sensing voltage in the middle of an on-time period (e.g., ½ $T_{on}$) to avoid an initial spike voltage problem when sampling the current sensing voltage at the beginning of the on-time period.

Depending upon embodiment, one or more of these benefits may be achieved. These benefits and various additional objects, features and advantages of the present invention can be fully appreciated with reference to the detailed description and accompanying drawings that follow.

4. BRIEF DESCRIPTION OF THE DRAWINGS

FIG. 5 is a simplified timing diagram for demagnetization detection of the power conversion system 400 shown in FIG. 4(a) or the power conversion system shown in FIG. 4(b) operating in the discontinuous conduction mode (DCM) according to an embodiment of the present invention.

5. DETAILED DESCRIPTION OF THE INVENTION

The present invention is directed to integrated circuits. More particularly, the invention provides systems and methods for voltage regulation and current regulation. Merely by way of example, the invention has been applied to a power conversion system. But it would be recognized that the invention has a much broader range of applicability.

Figure 4A:
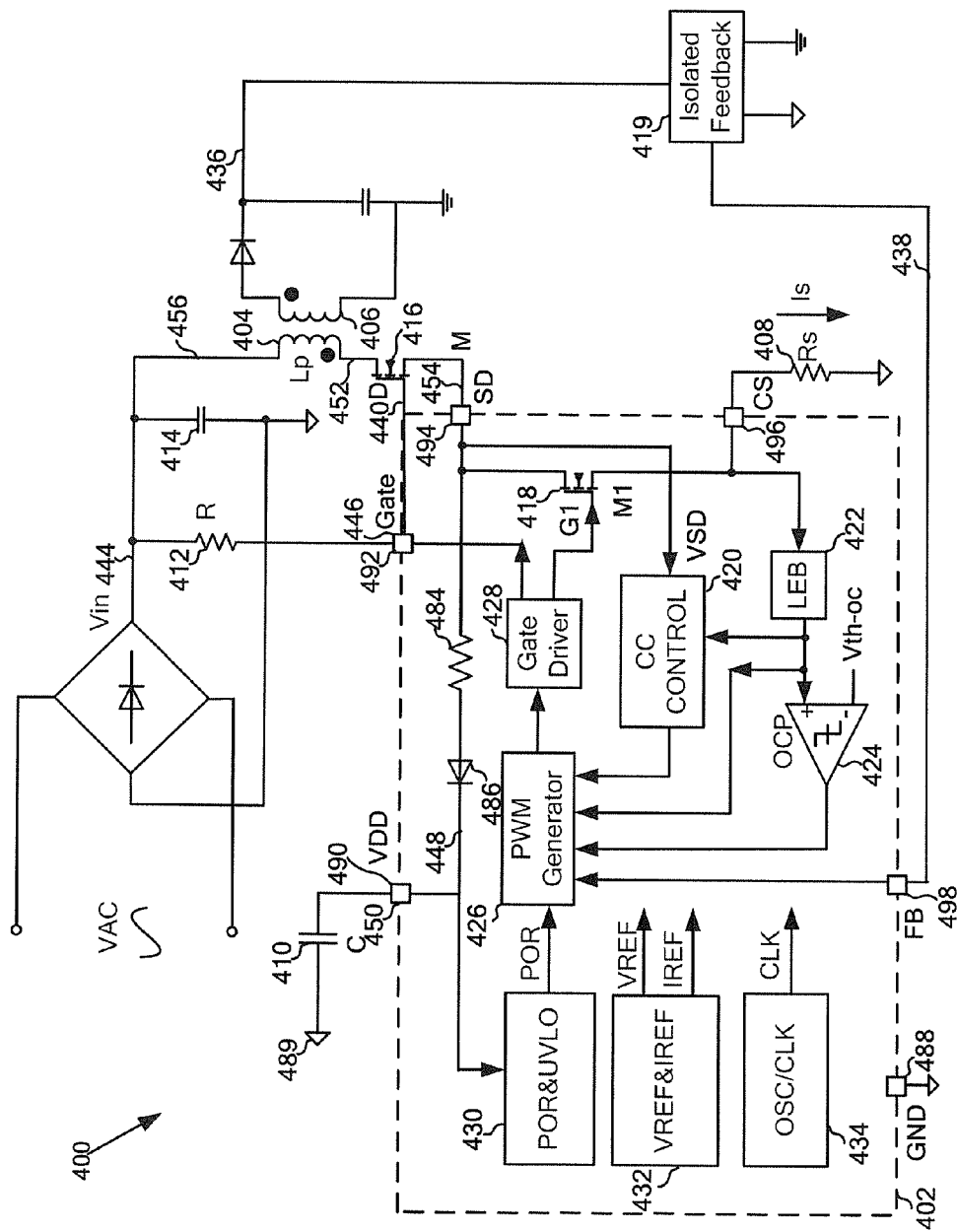
FIG. 4(a) is a simplified diagram showing a power conversion system with a controller according to an embodiment of the present invention.

FIG. 4(a) is a simplified diagram showing a power conversion system with a controller according to an embodiment of the present invention. This diagram is merely an example, which should not unduly limit the scope of the claims. One of ordinary skill in the art would recognize many variations, alternatives, and modifications.

The power conversion system 400 includes a controller 402, a primary winding 404, a secondary winding 406, a current sensing resistor 408, an isolated feedback component 419, two capacitors 410 and 414, a resistor 412, and a power switch 416. The controller 402 includes a switch 418, a current-control component 420, a leading-edge-blanking (LEB) component 422, an over-current-protection (OCP) component 424, a pulse-width-modulation (PWM) component 426, a gate driver 428, an under-voltage-lockout (UVLO) component 430, a reference signal generator 432, an oscillator 434, a resistor 484, and a diode 486. Further, the controller 402 includes six terminals 488, 490, 492, 494, 496 and 498. For example, the power switch 416 is a bipolar transistor. In another example, the power switch 416 is a field effect transistor (e.g., a MOSFET), and sustains a high drain-source voltage (e.g., larger than 600 volts). In yet another example, the switch 418 is a bipolar transistor. In yet another example, the switch 418 is a field effect transistor, and sustains a relatively low drain-source voltage (e.g., less than 40 volts). In yet another example, the controller 402 is on a chip, and the terminals 488, 490, 492, 494, 496 and 498 are pins on the chip. In yet another example, the capacitor 410 is off the chip, and coupled between the terminal 490 (e.g., terminal VDD) and a chip-ground voltage 489.

According to one embodiment, information related to the output voltage 436 is processed by the isolated feedback component 419 which generates a feedback signal 438. For example, the controller 402 receives the feedback signal 438 at the terminal 498 (e.g., terminal FB), and generates a gate-drive signal 440 at the terminal 492 (e.g., terminal Gate) to drive the switch 416 in order to regulate the output voltage 436.

According to another embodiment, when the power conversion system 400 starts up, the resistor 412 receives an input voltage 444, and a voltage 446 at the terminal 492 (e.g., terminal Gate) increases in magnitude. For example, the switch 416 is closed (e.g., on), and the switch 418 is open (e.g., off). In another example, a current 448 flows through the switch 416, the resistor 484 and the diode 486 to charge the capacitor 410, and as a result, a voltage 450 at the terminal 490 (e.g., terminal VDD) increases in magnitude. In yet another example, if the start-up process of the power conversions system 400 completes and the voltage 450 is higher than the voltage 446, there is no longer a current flowing through the resistor 484 and the diode 486 to charge the capacitor 410. In yet another example, the resistance of the resistor 412 can be increased to reduce power dissipation. In yet another example, after the start-up process of the power conversion system 400 completes, the power switches 416 and 418 are controlled to be turned on and off at the same time in normal operations. In yet another example, after the start-up process of the power conversion system 400 completes, the switch 418 is always kept on in normal operations.

As discussed above and further emphasized here, FIG. 4(a) is merely examples, which should not unduly limit the scope of the claims. One of ordinary skill in the art would recognize many variations, alternatives, and modifications. For example, the switch 416 is included in a controller 401 as part of a power conversion system, as shown in FIG. 4(b).

Figure 4B:
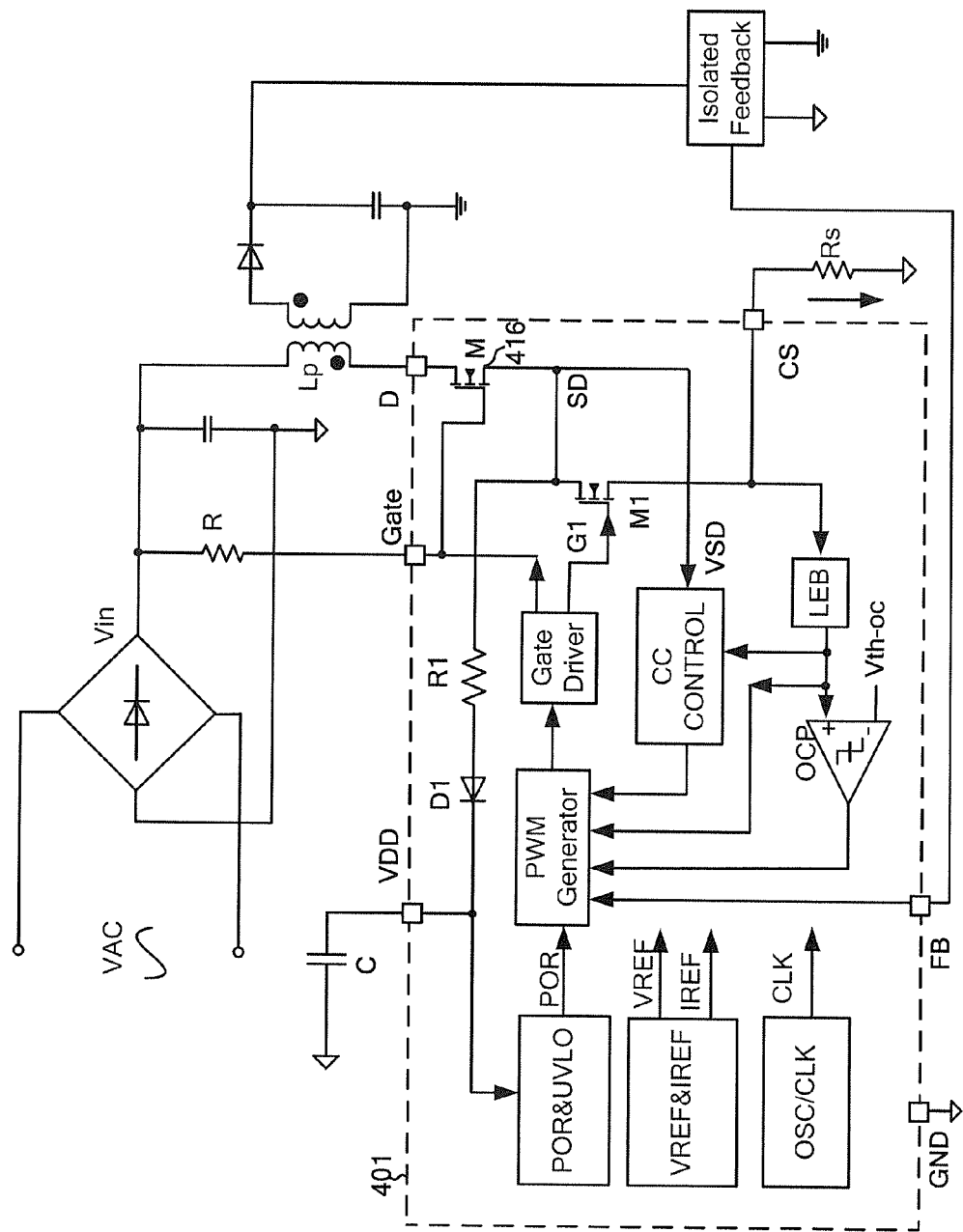
FIG. 4(b) is a simplified diagram showing a power conversion system with a controller according to another embodiment of the present invention.

FIG. 4(b) is a simplified diagram showing a power conversion system with a controller according to another embodiment of the present invention. This diagram is merely an example, which should not unduly limit the scope of the claims. One of ordinary skill in the art would recognize many variations, alternatives, and modifications. For example, the power conversion system shown in FIG. 4(b) operates similarly as the power conversion system 400.

Figure 1:
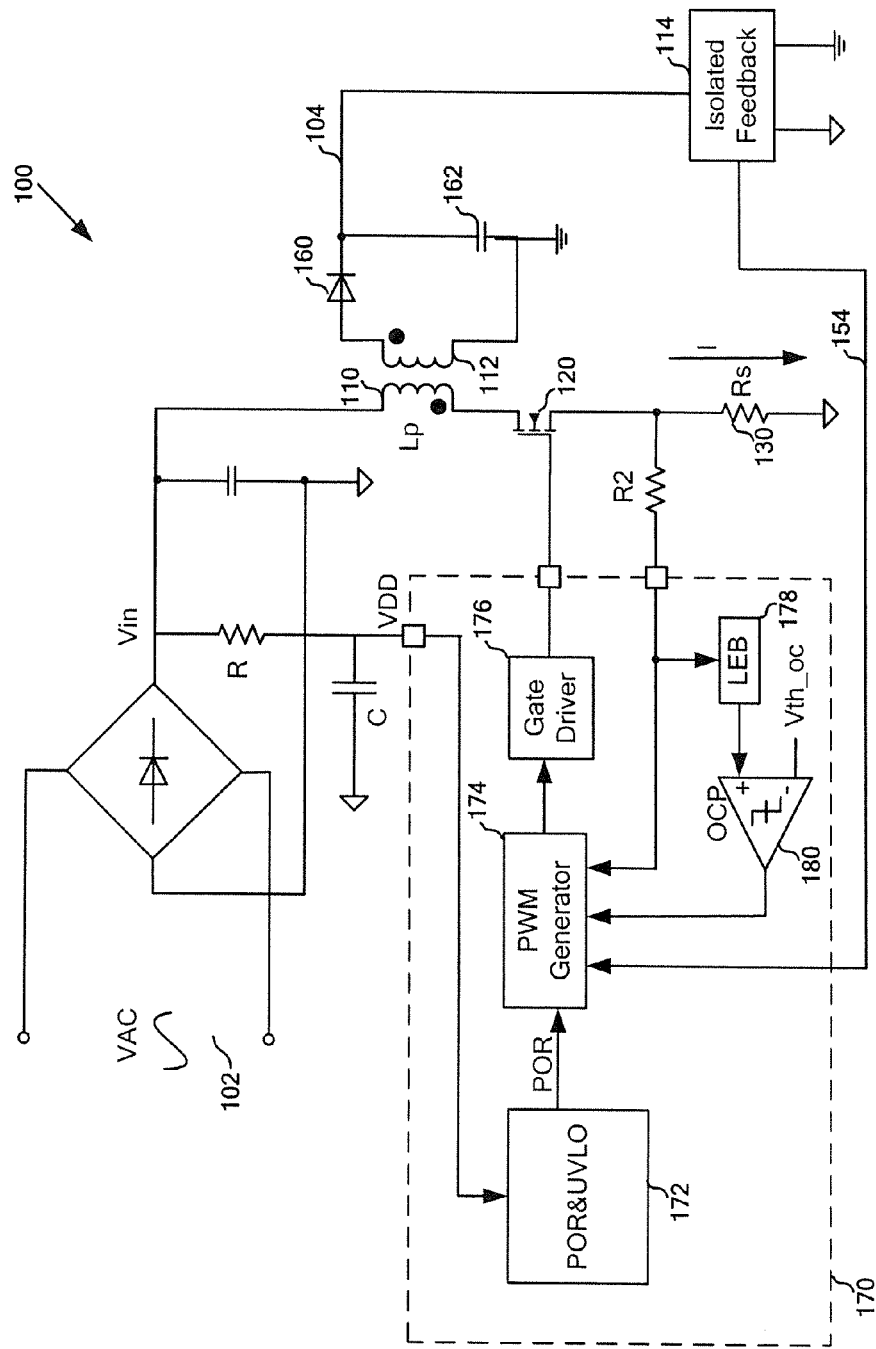
FIG. 1 is a simplified diagram showing a conventional flyback power conversion system.
Figure 2:
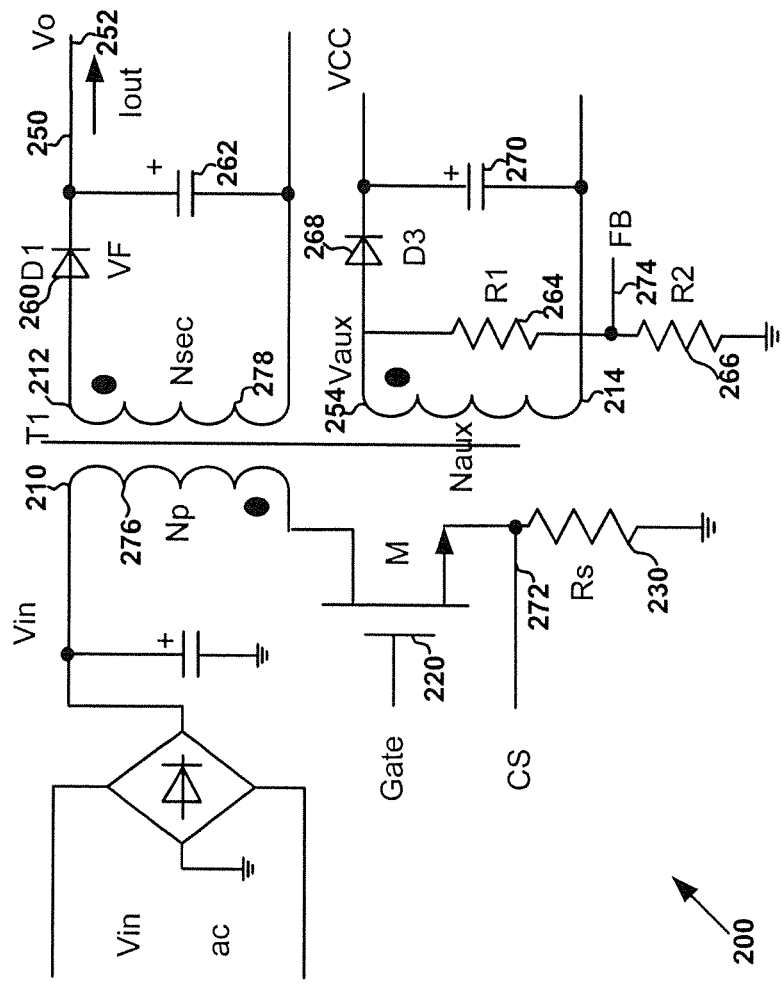
FIG. 2 is a simplified diagram showing another conventional flyback power conversion system.
Figure 3A:
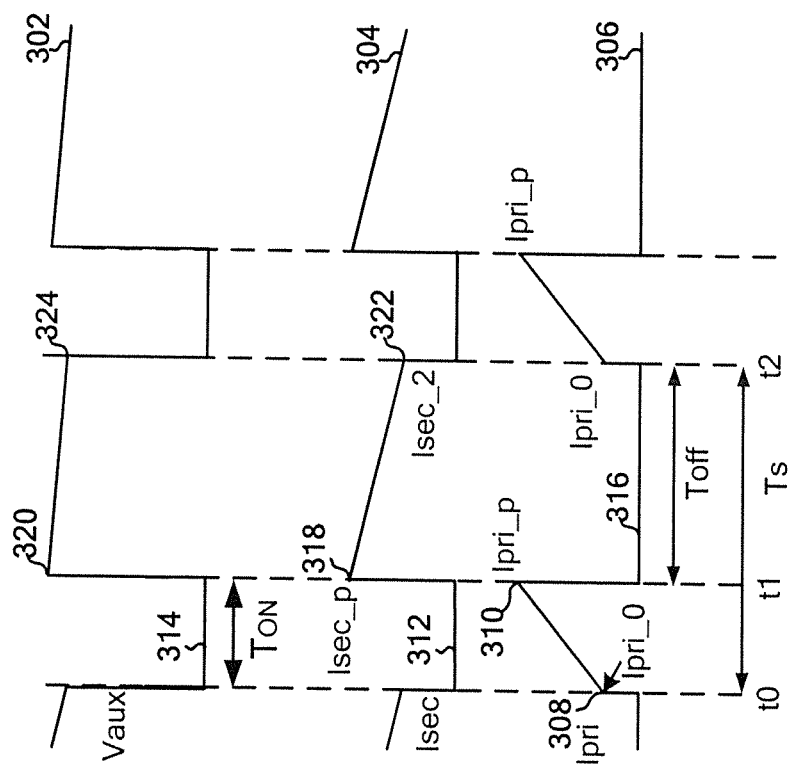
FIG. 3(A) is a simplified conventional timing diagram for the flyback power conversion system in FIG. 2 that operates in the continuous conduction mode (CCM).
Figure 3B:
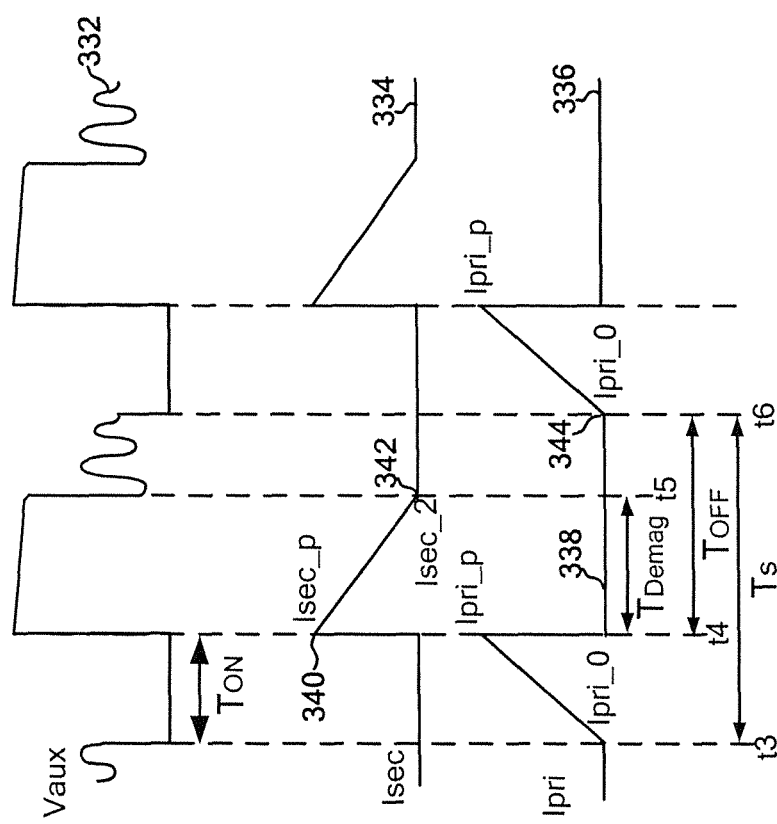
FIG. 3(B) is a simplified conventional timing diagram for the flyback power conversion system in FIG. 2 that operates in the discontinuous conduction mode (DCM).
Figure 3C:
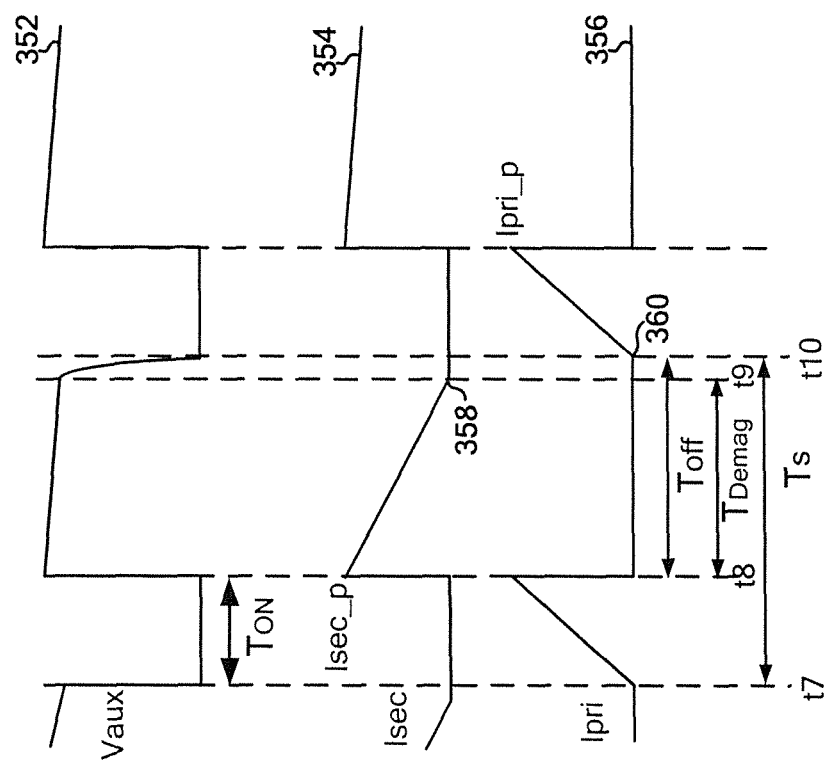
FIG. 3(C) is a simplified conventional timing diagram for the flyback power conversion system in FIG. 2 that operates in the quasi-resonant (QR) mode or the critical conduction mode (CRM).

Referring back to FIG. 2, the demagnetization process can be detected based on the voltage 254 of the auxiliary winding 214, for which an additional terminal is often needed on the controller chip. In contrast, a demagnetization process can be detected using voltages at terminal 452 and/or terminal 454 of the switch 416 in the power conversion system 400 shown in FIG. 4(a) or the power conversion system shown in FIG. 4(b), according to certain embodiments.

FIG. 5 is a simplified timing diagram for demagnetization detection of the power conversion system 400 shown in FIG. 4(a) or the power conversion system shown in FIG. 4(b) operating in the discontinuous conduction mode (DCM) according to an embodiment of the present invention. This diagram is merely an example, which should not unduly limit the scope of the claims. One of ordinary skill in the art would recognize many variations, alternatives, and modifications.

The waveform 502 represents a voltage of the terminal 452 of the switch 416 as a function of time, the waveform 504 represents a voltage of the terminal 454 of the switch 416 as a function of time, and the waveform 506 represents a slope of the voltage of the terminal 454 of the switch 416 as a function of time. For example, an on-time period, $T_{on}$, starts at time $t_{11}$ and ends at time $t_{12}$, and a demagnetization period, $T_{demag}$, starts at the time $t_{12}$ and ends at time $t_{13}$. In another example, $t_{11} \leq t_{12} \leq t_{13}$.

According to one embodiment, during the on-time period (e.g., $T_{on}$), both the switch 416 and the switch 418 are closed (e.g., on). For example, a primary current 456 that flows through the primary winding 404 increases in magnitude. In another example, the voltage of the terminal 452 (e.g., $V_D$) and the voltage of the terminal 454 (e.g., $V_{SD}$) have low magnitudes (e.g., as shown by the waveform 502 and the waveform 504 respectively).

According to another embodiment, if both the switch 416 and the switch 418 are open (e.g., off), the primary current 456 reduces to a low magnitude (e.g., zero), and the demagnetization process starts. For example, during the demagnetization period $T_{demag}$, the voltage of the terminal 452 (e.g., $V_D$) is approximately at a magnitude 508 (e.g., as shown by the waveform 502), and the voltage of the terminal 454 (e.g., $V_{SD}$) is approximately at a magnitude 510 (e.g., as shown by the waveform 504).

According to yet another embodiment, the demagnetization process ends at the time $t_{13}$. For example, the voltage of the terminal 454 (e.g., $V_{SD}$) decreases rapidly in magnitude (e.g., as shown by the waveform 504). In another example, the voltage drop at the terminal 454 is due to parasitic capacitance and the inductance of the transformer that includes the primary winding 404 and the secondary winding 406. Thus, the demagnetization can detected based on information associated with the voltage of the terminal 454 (e.g., $V_{SD}$). Though the above discussion is based on the timing diagram of the power conversion system 400 operating in the DCM mode, the scheme for demagnetization detection applies to the power conversion system 400 operating in the CCM mode or in the CRM mode according to certain embodiments.

Figure 6:
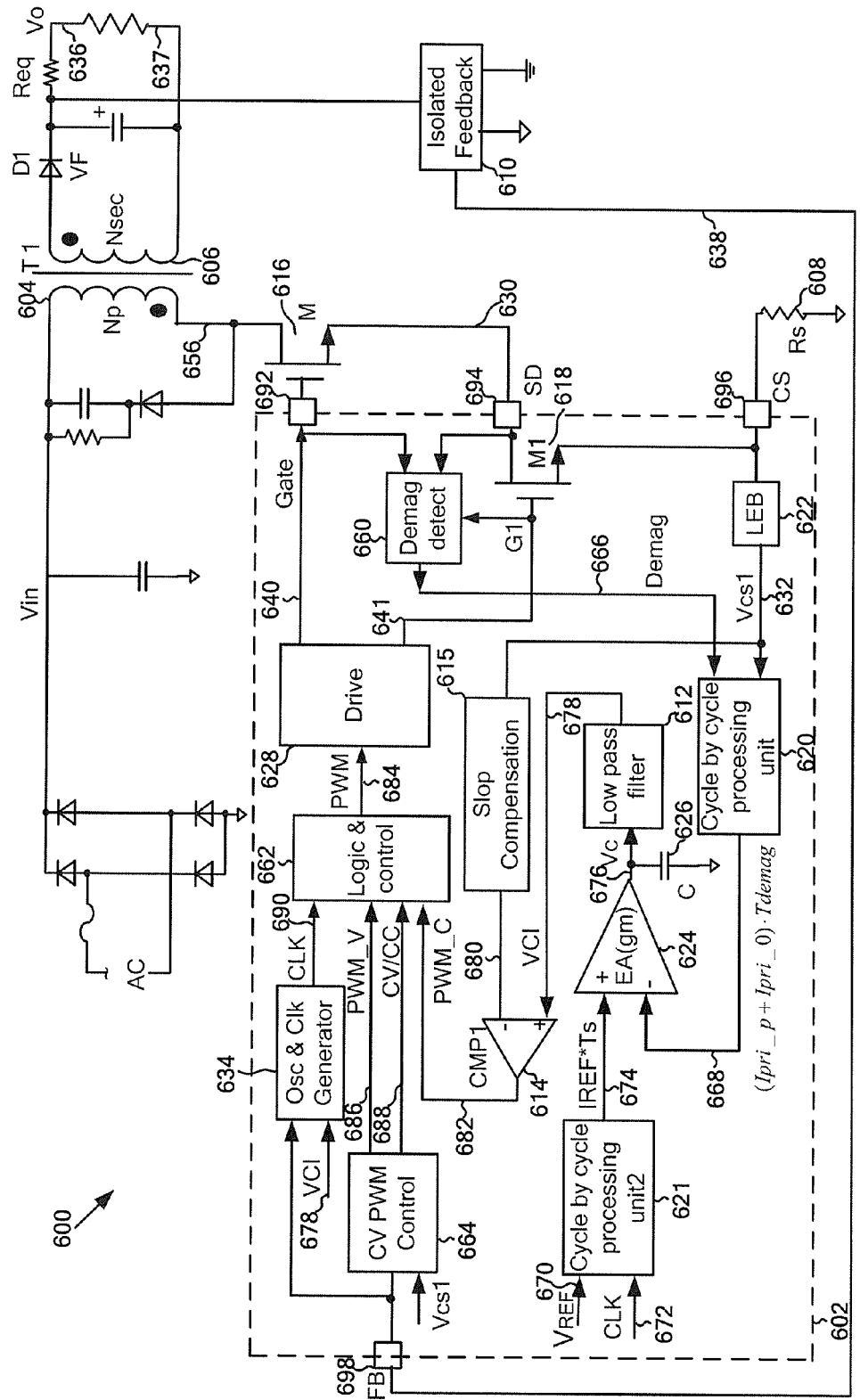
FIG. 6 is a simplified diagram showing a power conversion system with a controller according to yet another embodiment of the present invention.

FIG. 6 is a simplified diagram showing a power conversion system with a controller according to yet another embodiment of the present invention. This diagram is merely an example, which should not unduly limit the scope of the claims. One of ordinary skill in the art would recognize many variations, alternatives, and modifications.

The power conversion system 600 includes a controller 602, a primary winding 604, a secondary winding 606, a current sensing resistor 608, an isolated feedback component 610, and a power switch 616. The controller 602 includes a switch 618, a signal processing component 620, a signal generator 621, a leading-edge-blanking (LEB) component 622, an transconductance amplifier 624, a capacitor 626, a low pass filter 612, a comparator 614, a slope compensation component 615, a demagnetization detection component 660, a gate drive component 628, a logic control component 662, a voltage regulation component 664, and an oscillator 634. Further, the controller 602 includes four terminals, 692, 694, 696 and 698. For example, the power switch 616 is a bipolar transistor. In another example, the power switch 616 is a field effect transistor. In yet another example, the switch 618 is a field effect transistor. In yet another example, the primary winding 604, the secondary winding 606, the current sensing resistor 608, the isolated feedback component 610, the power switch 616, the switch 618, and the LEB component 622 are the same as the primary winding 404, the secondary winding 406, the current sensing resistor 408, the isolated feedback component 419, the power switch 416, the switch 418, and the LEB component 422. In yet another example, a current regulation loop includes the signal processing component 620, the transconductance amplifier 624, the capacitor 626, the demagnetization detection component 660, and the low pass filter 612.

According to one embodiment, information related to the output voltage 636 is processed by the isolated feedback component 610 which generates a feedback signal 638. For example, the controller 602 receives the feedback signal 638 at the terminal 698 (e.g., terminal FB), and generates a gate-drive signal 640 at the terminal 692 (e.g., terminal Gate) to drive the switch 616 in order to regulate the output voltage 636. In another example, the demagnetization component 660 receives the gate-drive signals 640 and 641 and a voltage signal 630 through the terminal 694 (e.g., terminal SD), and generates a demagnetization-detection signal 666. In yet another example, the demagnetization-detection signal 666 has a pulse width of $T_{demag}$ for each switching cycle, where $T_{demag}$ represents the duration of a demagnetization process in a switching cycle. In yet another example, the switches 616 and 618 are controlled to be turned on and off at the same time in normal operations. In yet another example, the switch 618 is always kept on in normal operations.

According to yet another embodiment, a primary current 656 that flows through the primary winding 604 is sensed using the resistor 608. For example, the resistor 608 generates, through the terminal 696 and with the leading-edge blanking component 622, a current sensing signal 632. In another example, for each switching cycle, the signal processing component 620 receives the current sensing signal 632 and the demagnetization-detection signal 666, and outputs a signal 668 that is equal to $(I_{pri\_p}+I_{pri\_0}) \times T_{demag}$ where $I_{pri\_0}$ represents the primary current 656 when an on-time period starts in a switching cycle and $I_{pri\_p}$ represents the primary current 656 when the on-time period ends in the switching cycle. In yet another example, for each switching cycle, the signal generator 621 receives a reference signal 670 and a clock signal 672 and outputs a signal 674 that is equal to $I_{ref} \times T_s$, where $I_{ref}$ represents a predetermined reference current and $T_s$ represents a switching period.

According to another embodiment, an integrator that includes the transconductance amplifier 624 and the capacitor 626 receives both the signal 668 and the signal 674, and outputs a signal 676 to the low pass filter 612. For example, the magnitude difference of the signals 668 and 674 (e.g., $I_{ref} \times T_s - (I_{pri\_p}+I_{pri\_0}) \times T_{demag}$) is amplified and integrated by the transconductance amplifier 624 and the capacitor 626. In yet another example, the low pass filter 612 outputs a signal 678 to the comparator 614. In yet another example, the comparator 614 also receives a signal 680 from the slope compensation component 615 and outputs a signal 682 to the logic control component 662. In yet another example, the voltage regulation component 664 receives the feedback signal 638 and the current sensing signal 632 and outputs signals 686 and 688 to the logic control component 662. In yet another example, the logic control component 662 outputs a signal 684 to the gate drive component 628 that generates the gate-drive signals 640 and 641. In yet another example, the signal 676 is used to adjust the pulse width of the gate-drive signals 640 and 641. In yet another example, the gate-drive signal 640 is the same as the gate-drive signal 641.

In one embodiment, the following equation is satisfied for the close loop configuration as shown in FIG. 6.

$$Limit_{N \to \infty} \left( \sum_{i=0}^{N} (I_{pri\_p}(i) + I_{pri\_0}(i)) \times T_{demag}(i) - \sum_{i=0}^{N} I_{ref} \times T_s(i) \right) < \alpha \quad \text{(Equation 8)}$$

where i represents the $i^{th}$ switching cycle, and α represents a predetermined threshold.

In another embodiment, if an output current 637 is in the range from zero to a predetermined maximum current, the power conversion system 600 operates in a constant voltage (CV) mode. For example, in the CV mode, the output voltage 636 is equal to a predetermined maximum voltage. In another example, if the output voltage is below the predetermined maximum voltage, the power conversion system 600 operates in a constant current (CC) mode. In yet another example, in the CC mode, the output current 637 is equal to the predetermined maximum current.

In yet another embodiment, in the CV mode, the signal 678 generated by the low pass filter 612 has a high magnitude. For example, the current regulation loop does not affect the signal 684 much in the CV mode. In another example, in the CC mode, since the output voltage 636 is lower than the predetermined maximum voltage, the feedback signal 638 has a high magnitude. In yet another example, in the CC mode, the signal 684 is not affected much by the voltage regulation process, but is affected by the current regulation loop.

In yet another embodiment, the oscillator 634 receives the feedback signal 638 and the signal 678 generated from the low pass filter 612 and outputs a clock signal 690 to the logic control component 662 for modulating the switching frequency in order to improve efficiency under different output load conditions.

Similar to what is discussed in FIG. 5, demagnetization detection in the power conversion system 600 can be achieved based on information associated with the voltage signal 630 at the terminal 694 (e.g., terminal SD). Because the voltage signal 630 often changes with different AC inputs or different transistors used as the switch 616, it is not easy to detect demagnetization based on absolute magnitudes of the voltage signal 630.

Referring back to FIG. 5, the slope of $V_{SD}$) is almost constant or decreases slowly (e.g., as shown by the waveform 506) during the demagnetization process, while at the end of the demagnetization process (e.g., at $t_{13}$), the slope of $V_{SD}$) drops rapidly. Thus, the slope of the voltage signal 630 can be used for demagnetization detection according to certain embodiments.

Figure 7:
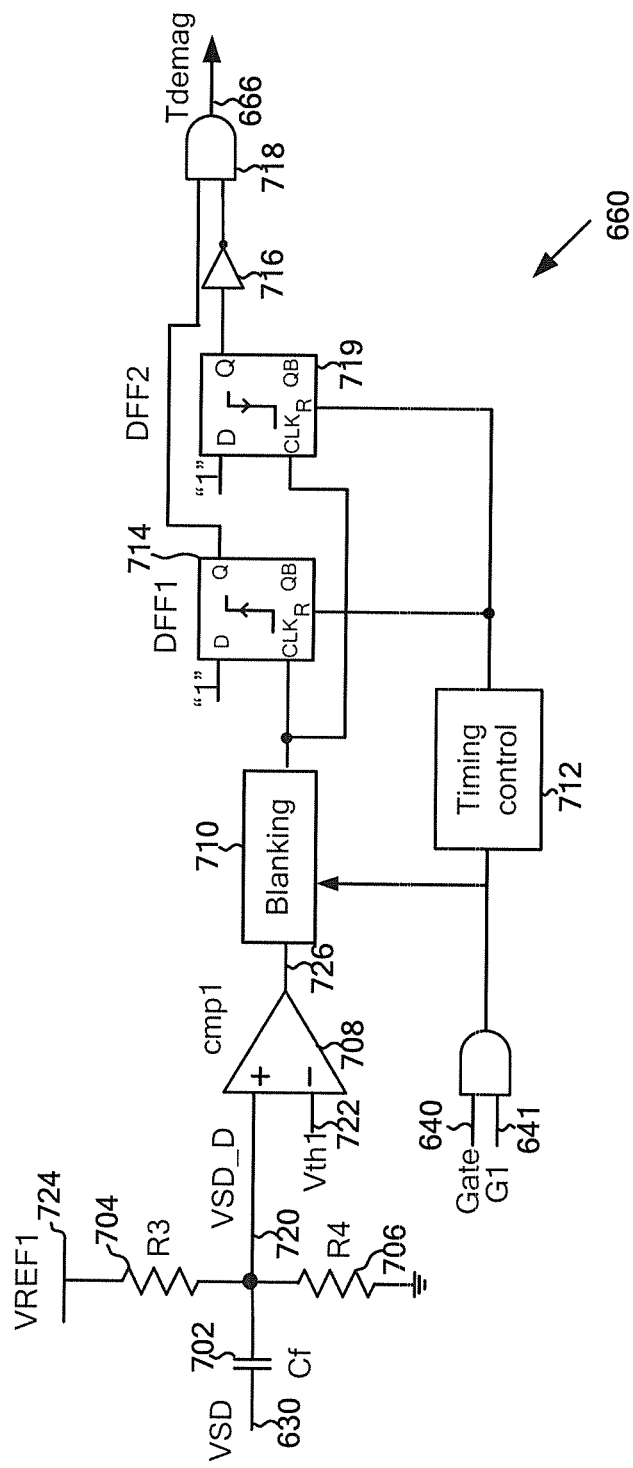
FIG. 7 is a simplified diagram showing certain components of the demagnetization component as part of the power conversion system shown in FIG. 6 according to an embodiment of the present invention.

FIG. 7 is a simplified diagram showing certain components of the demagnetization component 660 as part of the power conversion system 600 according to an embodiment of the present invention. This diagram is merely an example, which should not unduly limit the scope of the claims. One of ordinary skill in the art would recognize many variations, alternatives, and modifications. The demagnetization component 660 includes a capacitor 702, two resistors 704 and 706, a comparator 708, a blanking component 710, a timing control component 712, two flip-flop components 714 and 719, a NOT gate 716, and an AND gate 718.

According to one embodiment, the voltage signal 630 (e.g., $V_{SD}$) is received at the capacitor 702. For example, the slope of the voltage signal 630 is detected using a differentiator including the capacitor 702 and the resistors 704 and 706. In another example, a differentiated signal 720 is generated, and is equal to the slope of the voltage signal 630 plus a direct-current (DC) offset $V_m$. In yet another example, the DC offset $V_m$ is determined based on the following equation.

$$V_m = V_{ref1} \times \frac{R_4}{R_3 + R_4} \quad \text{(Equation 9)}$$

where $V_m$ represents the DC offset, $V_{ref1}$ represents a reference voltage 724, $R_3$ represents the resistance of the resistor 704, and $R_4$ represents the resistance of the resistor 706.

According to another embodiment, the comparator 708 receives the differentiated signal 720 and a threshold signal 722 and outputs a comparison signal 726 to the blanking component 710 to affect the flip-flop components 714 and 716. For example, the gate-drive signal 640 is received by the blanking component 710 and the timing control component 712 to affect the flip-flop components 714 and 716. In another example, for each switching cycle, a demagnetization process starts when the switch 616 or 618 is open (e.g., off) in response to the gate-drive signal 640 or 641 respectively. In yet another example, during the demagnetization process, the differentiated signal 720 is no less than the threshold signal 722 in magnitude. In yet another example, if the differentiated signal 720 becomes smaller than the threshold signal 722 in magnitude, then the end of the demagnetization process is detected. In yet another example, the comparator 708 changes the comparison signal 726 in order to change the demagnetization-detection signal 666. In yet another example, the gate-drive signal 641 can be used to replace the gate-driving signal 640.

Figure 8A:
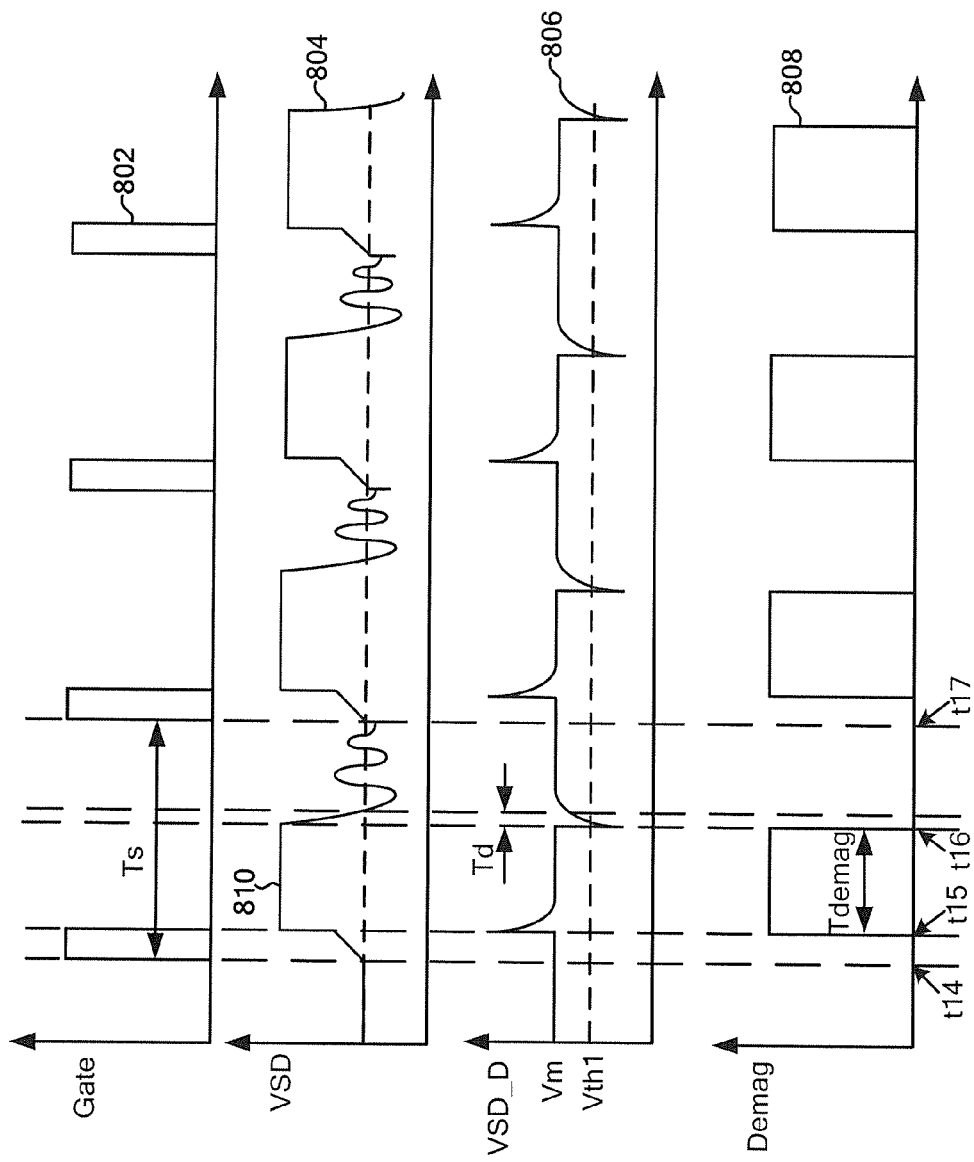
FIG. 8(a) is a simplified timing diagram for the demagnetization detection component as part of the power conversion system shown in FIG. 6 operating in the discontinuous conduction mode (DCM) according to an embodiment of the present invention.

FIG. 8(a) is a simplified timing diagram for the demagnetization detection component 660 as part of the power conversion system 600 operating in the discontinuous conduction mode (DCM) according to an embodiment of the present invention. This diagram is merely an example, which should not unduly limit the scope of the claims. One of ordinary skill in the art would recognize many variations, alternatives, and modifications.

The waveform 802 represents the gate-drive signal 640 as a function of time, the waveform 804 represents the voltage signal 630 as a function of time, the waveform 806 represents the differentiated signal 720 as a function of time, and the waveform 808 represents the demagnetization-detection signal 666 as a function of time. For example, an on-time period starts at time $t_{14}$ and ends at time $t_{15}$, a demagnetization period, $T_{demag}$, starts at the time $t_{15}$ and ends at time $t_{16}$, and a switching period, $T_s$, starts at the time $t_{14}$ and ends at time $t_{17}$. In another example, $t_{14} \leq t_{15} \leq t_{16} \leq t_{17}$.

According to one embodiment, during the on-time period, the gate-drive signal 640 is at a logic high level (e.g., as shown by the waveform 802). For example, the switch 616 is closed (e.g., on). In another example, at the end of the on-time period (e.g., at $t_{15}$), the gate-drive signal 640 changes from the logic high level to a logic low level (e.g., as shown by the waveform 802), and the switch 616 is open (e.g., off). In yet another example, the demagnetization period, $T_{demag}$, starts then.

According to another embodiment, during the demagnetization period $T_{demag}$, the gate-drive signal 640 remains at the logic low level (e.g., as shown by the waveform 802). For example, the voltage signal 630 (e.g., $V_{SD}$) keeps approximately at a magnitude 810 (e.g., as shown by the waveform 804). In another example, the differentiated signal 720 is larger than the threshold signal 722 in magnitude (e.g., as shown by the waveform 806). In yet another example, the demagnetization-detection signal 666 keeps at the logic high level (e.g., as shown by the waveform 808).

According to yet another embodiment, at the end of the demagnetization period (e.g., at $t_{16}$), the voltage signal 630 (e.g., $V_{SD}$) decreases rapidly from the magnitude 810 (e.g., as shown by the waveform 804). For example, the differentiated signal 720 becomes smaller than the threshold signal 722 in magnitude (e.g., as shown by the waveform 806). In another example, the comparator 708 changes the comparison signal 726 in response, and the demagnetization-detection signal 666 changes from the logic high level to the logic low level (e.g., as shown by the waveform 808).

Figure 8B:
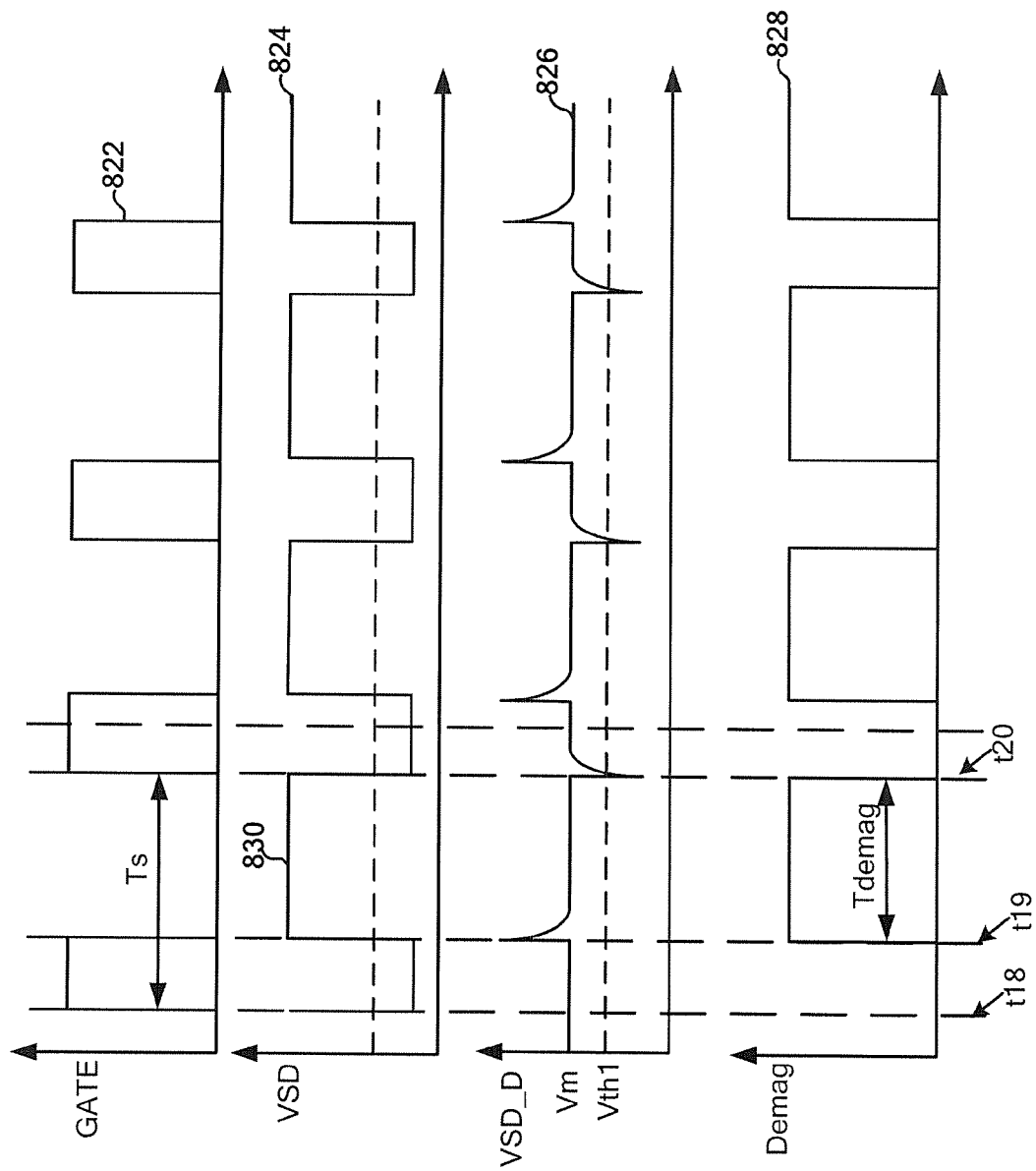
FIG. 8(b) is a simplified timing diagram for the demagnetization detection component as part of the power conversion system operating in the continuous conduction mode (CCM) according to another embodiment of the present invention.

FIG. 8(b) is a simplified timing diagram for the demagnetization detection component 660 as part of the power conversion system 600 operating in the continuous conduction mode (CCM) according to another embodiment of the present invention. This diagram is merely an example, which should not unduly limit the scope of the claims. One of ordinary skill in the art would recognize many variations, alternatives, and modifications.

The waveform 822 represents the gate-drive signal 640 as a function of time, the waveform 824 represents the voltage signal 630 as a function of time, the waveform 826 represents the differentiated signal 720 as a function of time, and the waveform 828 represents the demagnetization-detection signal 666 as a function of time.

For example, an on-time period starts at time $t_{18}$ and ends at time $t_{19}$, and a demagnetization period, $T_{demag}$, starts at the time $t_{19}$ and ends at time $t_{20}$. In another example, $t_{18} \leq t_{19} \leq t_{20}$.

Similar to FIG. 8(a), the demagnetization period starts when the gate-drive signal 640 changes from the logic high level to a logic low level (e.g., as shown by the waveform 822), and the switch 616 is open (e.g., off), according to certain embodiments. For example, during the demagnetization period, the voltage signal 630 (e.g., $V_{SD}$) keeps approximately at a magnitude 830 (e.g., as shown by the waveform 824). In yet another example, the differentiated signal 720 is larger than the threshold signal 722 in magnitude (e.g., as shown by the waveform 826). In yet another example, the demagnetization-detection signal 666 keeps at the logic high level (e.g., as shown by the waveform 828).

In another embodiment, at the end of the demagnetization period (e.g., at $t_{20}$), the voltage signal 630 (e.g., $V_{SD}$) decreases rapidly from the magnitude 830 (e.g., as shown by the waveform 824). For example, the differentiated signal 720 becomes smaller than the threshold signal 722 in magnitude (e.g., as shown by the waveform 826). In another example, the comparator 708 changes the comparison signal 726 in response, and the demagnetization-detection signal 666 changes from the logic high level to the logic low level (e.g., as shown by the waveform 828).

Figure 9:
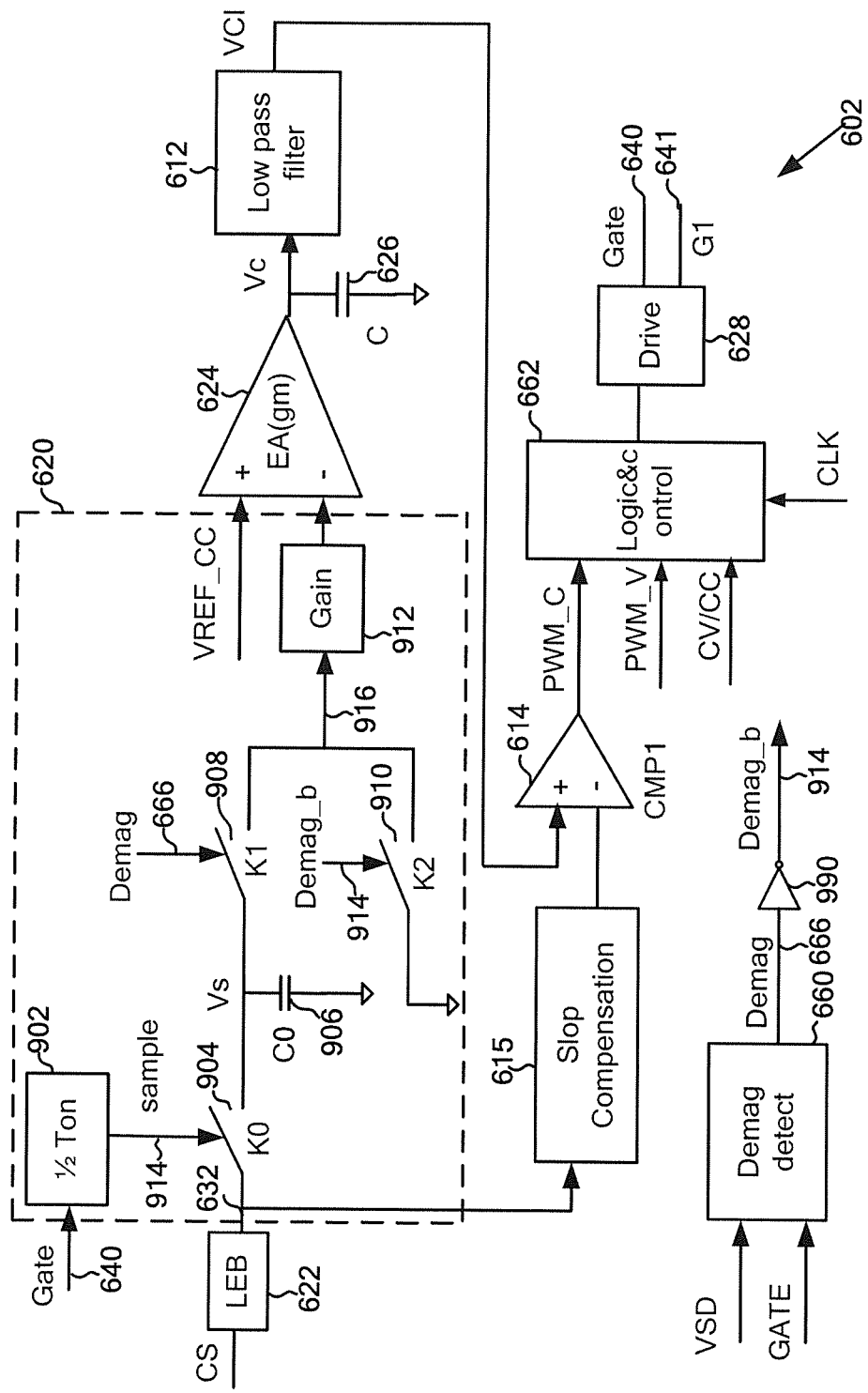
FIG. 9 is a simplified diagram showing certain components of the signal processing component as part of the power conversion system shown in FIG. 6 according to an embodiment of the present invention.

FIG. 9 is a simplified diagram showing certain components of the signal processing component 620 as part of the power conversion system 600 according to an embodiment of the present invention. This diagram is merely an example, which should not unduly limit the scope of the claims. One of ordinary skill in the art would recognize many variations, alternatives, and modifications. The signal processing component 620 includes a timing component 902, three switches 904, 908 and 910, a capacitor 906, and a gain stage 912.

According to one embodiment, during each switching cycle, if the gate-drive signal 640 changes from a logic low level to a logic high level, the current sensing signal 632 increases (e.g., linearly) in magnitude from an initial value. For example, in the CCM mode, the initial value is larger than zero. In another example, in the CRM mode or the DCM mode, the initial value is equal to zero.

According to another embodiment, the timing component 902 receives the gate-drive signal 640 and generates a control signal 914 to drive the switch 904 for sampling the current sensing signal 632. For example, during each switching cycle, the switch 904 is closed (e.g., on), in response to the control signal 914, in the middle of the on-time period (e.g., at ½ $T_{on}$) to sample the current sensing signal 632. In another example, the sampled signal (e.g., $V_s$) is held at the capacitor 906. In yet another example, the sampled signal (e.g., $V_s$) is equal, in magnitude, to the current sensing signal 632 in the middle of the on-time period (e.g., at ½ $T_{on}$), and thus is determined based on the following equation.

$$V_s = \frac{1}{2} \times (V_{cs\_0} + V_{cs\_1}) \qquad \text{(Equation 10)}$$

where $V_s$ represents the sampled signal, $V_{cs\_0}$ represents the magnitude of the current sensing signal 632 when the on-time period starts, and $V_{cs\_1}$ represents the magnitude of the current sensing signal 632 when the on-time period ends.

According to yet another embodiment, the demagnetization-detection signal 666 is received by a NOT gate 990 which generates a signal 914. For example, the signal 914 is at a logic low level when the demagnetization-detection signal 666 is at a logic high level. In another example, the signal 914 is at the logic high level when the demagnetization-detection signal 666 is at the logic low level. In yet another example, during a demagnetization process, the demagnetization-detection signal 666 is at the logic high level, and the switch 908 is closed (e.g., on) in response to the demagnetization-detection signal 666 to output the sampled signal (e.g., $V_s$). In yet another example, at any time other than the demagnetization period during the switching cycle, the signal 914 is at the logic high level and the switch 910 is closed (e.g., on) in response to the signal 914 to output a chip-ground voltage. Thus, an average of a signal 916 received by the gain stage 912 is determined based on the following equation according to certain embodiments.

$$V_{ave} = \frac{1}{T_s} \times (V_s \times T_{demag} + 0 \times T_{demag\_b}) = \qquad \text{(Equation 11)}$$
$$\frac{1}{2} \times (V_{cs\_0} + V_{cs\_1}) \times \frac{T_{demag}}{T_s}$$

where $V_{ave}$ represents the average of the signal 916, $T_s$ represents a switching period, $T_{demag}$ represents the demagnetization period, and $T_{demag\_b}$ represents the switching period excluding the demagnetization period.

Figure 10:
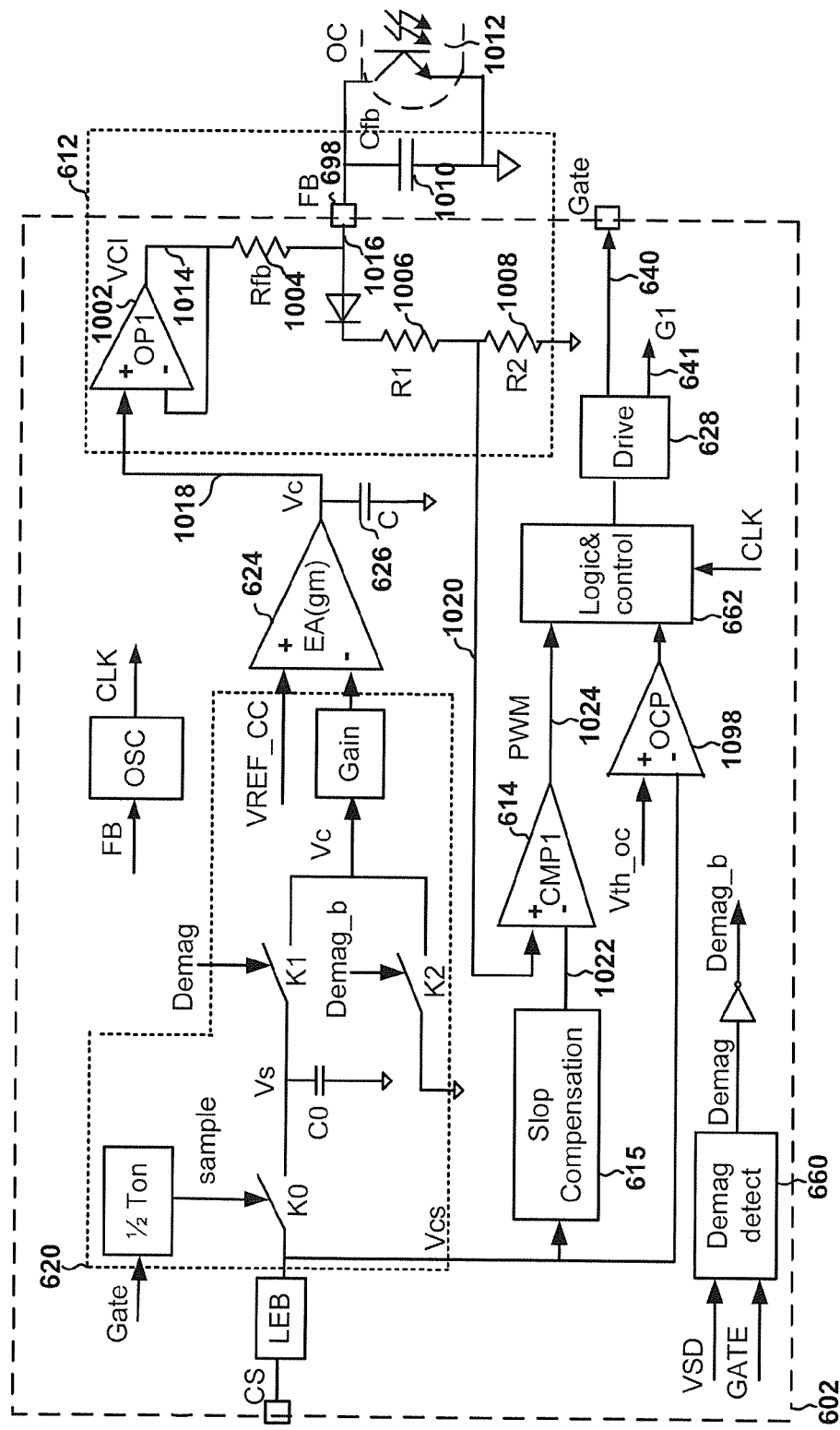
FIG. 10 is a simplified diagram showing certain components of the low pass filter as part of the power conversion system shown in FIG. 6 according to an embodiment of the present invention.

FIG. 10 is a simplified diagram showing certain components of the low pass filter 612 as part of the power conversion system 600 according to an embodiment of the present invention. This diagram is merely an example, which should not unduly limit the scope of the claims. One of ordinary skill in the art would recognize many variations, alternatives, and modifications. For example, the low pass filter 612 includes an amplifier 1002, three resistors 1004, 1006 and 1008, and a capacitor 1010. In another example, the capacitor 1010 is external to the controller 602. In yet another example, an opto-coupler 1012 is part of the isolated feedback component 610. In yet another example, a current regulation loop includes the demagnetization detection component 660, the signal processing component 620, the transconductance amplifier 624, the capacitor 626, and the low pass filter 612. In yet another example, a comparator 1098 is part of the voltage regulation component 664.

According to one embodiment, in the CV mode, an output current is smaller than the predetermined maximum current in magnitude. For example, the signal 1018 (e.g., $V_c$) has a large magnitude. In another example, the amplifier 1002 receives the signal 1018 and outputs to the resistor 1004 an amplified signal 1014 which has a large magnitude. In yet another example, the resistor 1004 is connected to the opto-coupler 1012 and operates as a load of the opto-coupler 1012. In yet another example, a feedback signal 1016 is generated at the terminal 698 (e.g., terminal FB). In yet another example, the comparator 614 receives a signal 1020 from the resistors 1006 and 1008 and a signal 1022 from the slope compensation component 615, and outputs a comparison signal 1024 for driving the switches 616 and 618. In yet another example, the comparison signal 1024 is affected by the feedback signal 1016. In yet another example, the signal 1018 is the same as the signal 676. In yet another example, the feedback signal 1016 is the same as the signal 638. In yet another example, the signal 1024 is the same as the signal 682. In yet another example, the signal 1020 is the same as the signal 678.

According to another embodiment, in the CC mode, an output voltage is smaller than the predetermined maximum voltage in magnitude. For example, a current flowing through the collector of the opto-coupler 1012 has a low magnitude (e.g., zero). In another example, the feedback signal 1016 is affected by the current regulation loop. In yet another example, the comparator 614 changes the comparison signal 1024 based on information associated with the feedback signal 1016 to regulate the output current. In yet another example, the resistors 1004, 1006 and 1008 and the capacitor 1010 perform as part of the low pass filter 612.

As shown in FIG. 10, the current regulation loop that includes the demagnetization detection component 660, the signal processing component 620, the transconductance amplifier 624, the capacitor 626 and the low pass filter 612 shares terminal 698 (e.g., terminal FB) with the voltage regulation loop that includes the opto-coupler 1012 and the capacitor 1010, according to certain embodiments. For example, both the current regulation loop and the voltage regulation loop implement the comparator 614, the logic control component 662 and the gate drive component 628 to affect the gate-drive signals 640 and 641 in order to achieve constant current regulation and constant voltage regulation respectively.

As discussed above and further emphasized here, FIG. 10 is merely examples, which should not unduly limit the scope of the claims. One of ordinary skill in the art would recognize many variations, alternatives, and modifications. For example, certain components may be included in the controller to perform different functions, such as level shifting and blocking, as shown in FIG. 11.

Figure 11:
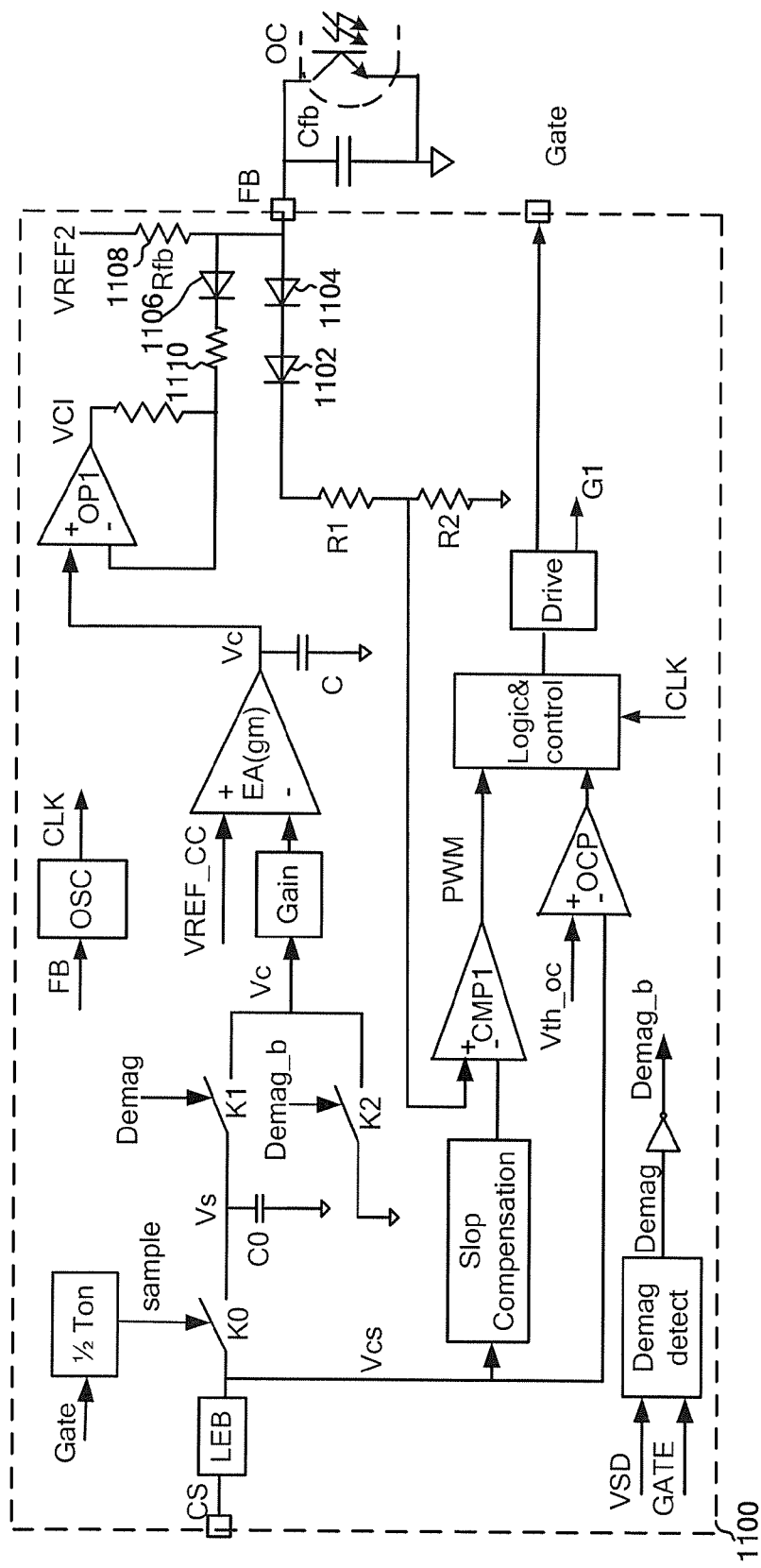
FIG. 11 is a simplified diagram showing certain components of the low pass filter as part of the power conversion system shown in FIG. 6 according to another embodiment of the present invention.

FIG. 11 is a simplified diagram showing certain components of the low pass filter 612 as part of the power conversion system 600 according to another embodiment of the present invention. This diagram is merely an example, which should not unduly limit the scope of the claims. One of ordinary skill in the art would recognize many variations, alternatives, and modifications. For example, compared with the controller 602 shown in FIG. 10, the controller 1100 further includes three diodes 1102, 1104 and 1106, and two resistors 1108 and 1110 to perform various functions, including level shifting and blocking.

Figure 12:
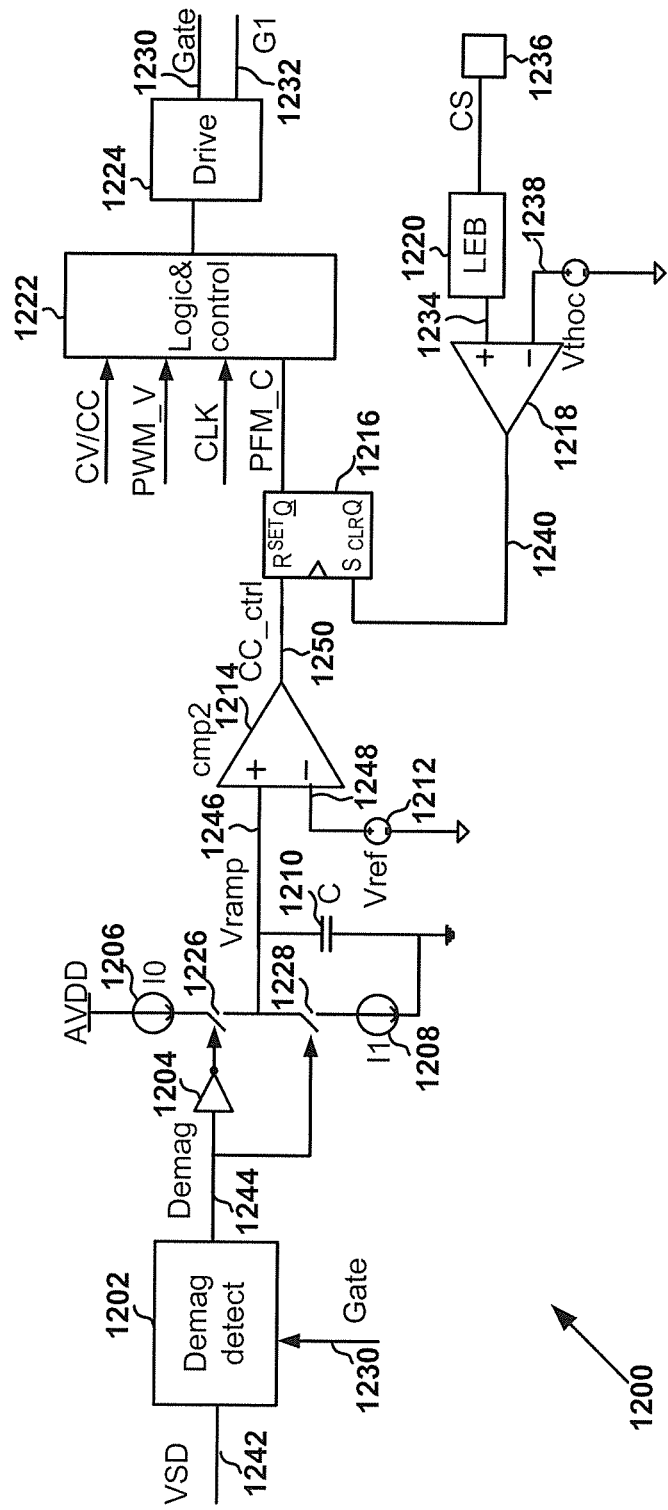
FIG. 12 is a simplified diagram showing certain components of a controller according to an embodiment of the present invention.

FIG. 12 is a simplified diagram showing certain components of a controller according to an embodiment of the present invention. This diagram is merely an example, which should not unduly limit the scope of the claims. One of ordinary skill in the art would recognize many variations, alternatives, and modifications.

The controller 1200 includes a demagnetization detection component 1202, a NOT gate 1204, two current-mirror components 1206 and 1208, two switches 1226 and 1228, a capacitor 1210, a voltage generator 1212, two comparators 1214 and 1218, a flip-flop component 1216, a leading-edge-blanking (LEB) component 1220, a gate drive component 1224, and a logic control component 1222. The controller 1200 further includes a terminal 1236. For example, the demagnetization detection component 1202, the leading-edge-blanking (LEB) component 1220, the gate drive component 1224, and the logic control component 1222 are the same as the demagnetization detection component 660, the leading-edge-blanking (LEB) component 622, the gate drive component 628, and the logic control component 662.

The controller 1200 is used to replace at least part of the controller 602 for the power conversion system 600 in some embodiments. For example, after the power conversion system 600 starts, the gate drive component 1224 outputs gate-drive signals 1230 and 1232 to turn on the switches 616 and 618 respectively. In another example, a primary current begins to flow through the primary winding 604. In yet another example, the comparator 1218 receives a current sensing signal 1234 that is related to the primary current and outputs a comparison signal 1240. In yet another example, if the current sensing signal 1234 is larger than a threshold signal 1238 in magnitude, the comparator 1218 changes the comparison signal 1240 in order to turn off the switches 616 and 618. In yet another example, the signals 1230 and 1232 are the same as the signals 640 and 641 respectively. In yet another example, the signal 1234 is the same as the signal 632.

In another embodiment, if the switches 616 and 618 are open (e.g., off), a demagnetization process begins. For example, a secondary current that flows through the secondary winding 606 decreases in magnitude (e.g., linearly). In another example, the demagnetization detection component 1202 receives a voltage signal 1242 (e.g., Vsp) related to a switching node and the gate-drive signal 1230 and generates a demagnetization-detection signal 1244.

In yet another embodiment, during the demagnetization process, the demagnetization detection component 1202 generates the demagnetization-detection signal 1244 at a logic high level. For example, the switch 1228 is closed (e.g., on) in response to the signal 1244. In another example, the current-mirror component 1208 discharges the capacitor 1210, and a voltage signal 1246 at the capacitor 1210 decreases in magnitude (e.g., linearly). In yet another example, at the end of the demagnetization process, the demagnetization detection component 1202 changes the demagnetization-detection signal 1244 from the logic high level to a logic low level, and the switch 1226 is closed (e.g., on) in response. In yet another example, the current-mirror component 1206 charges the capacitor 1210, and the voltage signal 1246 increases in magnitude (e.g., linearly). In yet another example, if the voltage signal 1246 is larger in magnitude than a reference voltage 1248 generated by the voltage generator 1212, the comparator 1214 outputs the comparison signal 1250 at the logic high level. In yet another example, in response, the gate drive component 1224 outputs the gate-drive signals 1230 and 1232 to turn on the switches 616 and 618 respectively.

Thus, in some embodiments, a switching period of the power conversion system 600 with the controller 1200 can be determined based on the following equation:

$$T_s = \frac{I_0 + I_1}{I_1} \times T_{demag} \qquad \text{(Equation 12)}$$

where $T_s$ represents the switching period, $T_{demag}$ represents the demagnetization period, $I_0$ represents a current that flows through the current-mirror component 1206, and $I_1$ represents a current that flows through the current-mirror component 1208.

In another embodiment, a peak value of the primary current that flows through the primary winding 604 is determined based on the following equation:

$$I_p = \frac{V_{thoc}}{R_s} \quad \text{(Equation 13)}$$

where $I_p$ represents the peak value of the primary current, $V_{thoc}$ represents the threshold signal 1238, and $R_s$ represents the resistance of the resistor 608.

Assuming the transformer including the primary winding 604 and the secondary winding 606 has a transfer efficiency of 100%, an output current of the power conversion system 600 can be determined based on the following equation in some embodiments.

$$I_{out} = \frac{\frac{1}{2} \times N \times I_p \times T_{demag}}{T_s} \quad \text{(Equation 14)}$$

where $I_{out}$ represents the output current, and N represents the turns ratio between the primary winding 604 and the secondary winding 606. For example, combining Equations 12, 13 and 14, the output current can be determined based on the following equation:

$$I_{out} = \frac{1}{2} \times \frac{I_1}{I_0 + I_1} \times \frac{V_{thoc}}{R_s} \quad \text{(Equation 15)}$$

Thus, the output current can be controlled to be a constant current according to certain embodiments.

According to another embodiment, a system controller for regulating a power conversion system includes a first controller terminal, a second controller terminal and a third controller terminal. The system controller is configured to receive an input signal at the first controller terminal and turn on or off a switch based on at least information associated with the input signal to adjust a primary current flowing through a primary winding of the power conversion system, receive a first signal at the second controller terminal from the switch, and charge a capacitor through the third controller terminal in response to the first signal. For example, the system controller is implemented according to at least FIG. 4(*a*) and/or FIG. 4(*b*).

According to another embodiment, a system controller for regulating a power conversion system includes a first controller terminal and a second controller terminal. The system controller is configured to generate a drive signal at the first controller terminal to turn on or off a switch to adjust a primary current flowing through a primary winding of the power conversion system, receive a first signal at the second controller terminal from the switch, and generate a detection signal associated with a demagnetization process of the primary winding of the power conversion system based on at least information associated with the first signal. For example, the system controller is implemented according to FIG. 4(*a*), FIG. 4(*b*), FIG. 5, FIG. 6, FIG. 7, FIG. 8(*a*), FIG. 8(*b*), FIG. 9, FIG. 10, FIG. 11 and/or FIG. 12.

According to yet another embodiment, a system for regulating a power conversion system includes a system controller, a feedback component and a capacitor. The system controller includes a current regulation component and a drive component, the system controller further including a first controller terminal connected to the current regulation component and a second controller terminal connected to the drive component. The feedback component is connected to the first controller terminal and configured to receive an output signal associated with a secondary winding of a power conversion system. The capacitor includes a first capacitor terminal and a second capacitor terminal, the first capacitor terminal being connected to the first controller terminal. The current regulation component is configured to receive at least a current sensing signal and affect a feedback signal at the first controller terminal based on at least information associated with the current sensing signal, the current sensing signal being associated with a primary current flowing through a primary winding of the power conversion system. The drive component is configured to process information associated with the current sensing signal and the feedback signal, generate a drive signal based on at least information associated with the current sensing signal and the feedback signal, and send the drive signal to a switch through the second controller terminal in order to adjust the primary current. For example, the system controller is implemented according to at least FIG. 10 and/or FIG. 11.

In another embodiment, a method for regulating a power conversion system by at least a system controller including a first controller terminal, a second controller terminal and a third controller terminal includes: receiving an input signal at the first controller terminal, turning on or off a switch based on at least information associated with the input signal to adjust a primary current flowing through a primary winding of the power conversion system, receiving a first signal at the second controller terminal from the switch, and charging a capacitor through the third controller terminal in response to the first signal. For example, the method is implemented according to at least FIG. 4(*a*) and/or FIG. 4(*b*).

In yet another embodiment, a method for regulating a power conversion system by at least a system controller including a first controller terminal and a second controller terminal include: generating a drive signal at the first controller terminal to turn on or off a switch to adjust a primary current flowing through a primary winding of the power conversion system, receiving a first signal at the second controller terminal from the switch, and generating a detection signal associated with a demagnetization process of the primary winding of the power conversion system based on at least information associated with the first signal. For example, the method is implemented according to FIG. 4(*a*), FIG. 4(*b*), FIG. 5, FIG. 6, FIG. 7, FIG. 8(*a*), FIG. 8(*b*), FIG. 9, FIG. 10, FIG. 11 and/or FIG. 12.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system controller for regulating a power conversion system, the system controller comprising:
    a first controller terminal;
    a second controller terminal;
    a first switch; and
    a third controller terminal;
    wherein the system controller is configured to:
        generate a drive signal at the first controller terminal to turn on or off a second switch to adjust a primary current flowing through a primary winding of the power conversion system;
        receive a first signal at the second controller terminal from the second switch; and
        generate a detection signal associated with a demagnetization process of the primary winding of the power conversion system based on at least information associated with the first signal;
    wherein the first switch is configured to receive the first signal at the second controller terminal and a current sensing signal at the third controller terminal and be turned on or off based on at least information associated with the drive signal, the current sensing signal being associated with the primary current flowing through the primary winding of the power conversion system.

2. The system controller of claim 1 wherein the first switch is further configured to be turned on when the second switch is turned on and be turned off when the second switch is turned off.

3. The system controller of claim 2 wherein the system controller is further configured to generate the detection signal based on at least information associated with a change rate of the first signal.

4. The system controller of claim 3 wherein the change rate of the first signal reduces at the end of the demagnetization process.

5. The system controller of claim 2, and further comprising a demagnetization detector configured to receive the drive signal and the first signal and generate the detection signal based on at least information associated with the drive signal and the first signal.

6. The system controller of claim 5 wherein:
    the demagnetization detector is further configured to generate the detection signal at a first logic level if the primary winding operates in the demagnetization process; and
    the demagnetization detector is further configured to generate the detection signal at a second logic level if the primary winding does not operate in the demagnetization process.

7. The system controller of claim 6 wherein the second switch is turned on or off at a switching frequency, a switching period associated with the switching frequency including an on-time period and an off-time period, the second switch being turned on during the on-time period and being turned off during the off-time period.

8. The system controller of claim 7, and further comprising:
    a first signal processing component configured to receive the current sensing signal associated with the primary current and the detection signal associated with the demagnetization process, and generate a first processed signal based on at least information associated with the current sensing signal and the detection signal;
    a second signal processing component configured to receive a reference voltage signal and a clock signal, and generate a second processed signal based on at least information associated with the reference voltage signal and the clock signal; and
    an error amplifier configured to receive the first processed signal and the second processed signal and output an amplified signal based on at least information associated with the first processed signal and the second processed signal in order to adjust the drive signal.

9. The system controller of claim 8, and further comprising:
    a low pass filter configured to receive the amplified signal and generate a filtered signal based on at least information associated with the amplified signal; and
    a comparator configured to receive the filtered signal and the current sensing signal and output a modulation signal based on at least information associated with the filtered signal and the current sensing signal in order to adjust the drive signal to achieve constant current regulation.

10. The system controller of claim 8 wherein the first signal processing component includes:
    a sample and hold component configured to sample and hold the current sensing signal at a middle point of an on-time period during each switching period;
    a signal selection component configured to output the held sampled current sensing signal if the detection signal is at the second logic level, and output a ground voltage if the detection signal is at the first logic level; and
    an amplifying component configured to receive the held sampled current sensing signal or the ground voltage and output the first processed signal.

11. The system of claim 10 wherein the sample and hold component includes:
    a timing component configured to receive the drive signal and generate a sampled current sensing signal at the middle point of the on-time period during each switching period; and
    a capacitor configured to hold the sampled current sensing signal.

12. The system controller of claim 6 wherein the demagnetization detector includes:
    a differentiation component configured to receive the first signal and output a differentiated signal based on at least information associated with the first signal;
    a comparator configured to receive at least the differentiated signal and generate a comparison signal; and
    a detection component configured to receive the comparison signal and the drive signal and output the detection signal based on at least information associated with the comparison signal and the drive signal.

13. The system controller of claim 12 wherein the differentiation component includes:
    a capacitor including a first capacitor terminal and a second capacitor terminal;
    a first resistor including a first resistor terminal and a second resistor terminal; and
    a second resistor including a third resistor terminal and a fourth resistor terminal;
    wherein:
        the first resistor terminal is biased to a first predetermined voltage;
        the second resistor terminal is connected to the third resistor terminal;
        the second capacitor terminal is connected to the second resistor terminal; and
        the fourth resistor terminal is biased to a second predetermined voltage;

wherein:
the first capacitor terminal is configured to receive the first signal; and
the second resistor terminal is configured to output the differentiated signal.

14. The system controller of claim 6, and further comprising:
an output-current-regulation component configured to receive the detection signal, generate a first predetermined current if the detection signal is at the first logic level, and generate a second predetermined current if the detection signal is at the second logic level.

15. The system controller of claim 14, and further comprising:
a capacitor configured to be charged with the first predetermined current if the detection signal is at the first logic level and be discharged with the second predetermined current if the detection signal is at the second logic level.

16. The system controller of claim 15, and further comprising:
a first comparator configured to receive a voltage signal from the capacitor and a reference signal and outputs a first comparison signal based on at least information associated with the voltage signal and the reference signal;
wherein:
if the voltage signal is larger than the reference signal in magnitude, the first comparator is further configured to change the first comparison signal in order to change the drive signal.

17. The system controller of claim 16, and further comprising:
a second comparator configured to receive the current sensing signal and a threshold signal and output a second comparison signal based on at least information associated with the current sensing signal and the threshold signal; and
a flip-flop component configured to receive the first comparison signal and the second comparison signal and generate an output signal in order to generate the drive signal.

18. A method for regulating a power conversion system by at least a system controller including a first controller terminal, a second controller terminal, and a third controller terminal, the method comprising:

generating a drive signal at the first controller terminal to turn on or off a first switch to adjust a primary current flowing through a primary winding of the power conversion system;
receiving a first signal at the second controller terminal from the first switch;
generating a detection signal associated with a demagnetization process of the primary winding of the power conversion system based on at least information associated with the first signal; and
receiving a current sensing signal at the third controller terminal, the current sensing signal being associated with the primary current flowing through the primary winding of the power conversion system;
wherein:
the receiving a first signal at the second controller terminal includes receiving, by a second switch, the first signal; and
the receiving a current sensing signal at the third controller terminal includes receiving, by the second switch, the current sensing signal;
wherein the second switch is configured to be turned on or off based on at least information associated with the drive signal.

19. The method of claim 18, and further comprising:
receiving the detection signal;
generating a first processed signal based on at least information associated with the current sensing signal and the detection signal;
receiving a reference voltage signal and a clock signal;
generating a second processed signal based on at least information associated with the reference voltage signal and the clock signal;
receiving the first processed signal and the second processed signal;
generating an amplified signal based on at least information associated with the first processed signal and the second processed signal;
receiving the amplified signal;
generating a filtered signal based on at least information associated with the amplified signal;
receiving the filtered signal; and
outputting a modulation signal based on at least information associated with the filtered signal and the current sensing signal to adjust the drive signal in order to achieve constant current regulation.

* * * * *